(12) United States Patent
Watanabe

(10) Patent No.: US 7,751,472 B2
(45) Date of Patent: Jul. 6, 2010

(54) WIRELESS COMMUNICATION APPARATUS, WIRELESS COMMUNICATION METHOD AND COMPUTER PROGRAM THEREFOR

(75) Inventor: Katsumi Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 906 days.

(21) Appl. No.: 11/530,328

(22) Filed: Sep. 8, 2006

(65) Prior Publication Data

US 2007/0058745 A1 Mar. 15, 2007

(30) Foreign Application Priority Data

Sep. 9, 2005 (JP) .......................... P2005-261665

(51) Int. Cl.
 *H04B 1/66* (2006.01)
 *H04L 5/12* (2006.01)
 *H04L 23/02* (2006.01)
(52) U.S. Cl. .................. 375/240; 375/264; 375/341; 375/130; 375/262; 704/500; 714/786; 714/794; 714/795
(58) Field of Classification Search ................. None
 See application file for complete search history.

(56) References Cited

U.S. PATENT DOCUMENTS

| | | | | |
|---|---|---|---|---|
| 6,363,124 | B1* | 3/2002 | Cochran | 375/326 |
| 6,690,745 | B1* | 2/2004 | Horii et al. | 375/316 |
| 6,717,993 | B1* | 4/2004 | Shiraishi et al. | 375/329 |
| 6,834,088 | B2* | 12/2004 | Agami et al. | 375/324 |
| 7,515,643 | B2* | 4/2009 | Chung | 375/267 |
| 2002/0126748 | A1* | 9/2002 | Rafie et al. | 375/229 |
| 2003/0189994 | A1* | 10/2003 | Sommer et al. | 375/341 |
| 2004/0161047 | A1* | 8/2004 | Liu et al. | 375/260 |
| 2005/0008101 | A1* | 1/2005 | Kazi et al. | 375/330 |
| 2006/0067422 | A1* | 3/2006 | Chung | 375/295 |
| 2006/0285603 | A1* | 12/2006 | Yim et al. | 375/261 |

FOREIGN PATENT DOCUMENTS

JP 2002-330188 11/2002

OTHER PUBLICATIONS

MBOFDM PHY Specification Final Release 1.0, Wimedia Alliance, Apr. 27, 2005.
Griffin, Grant, Lewegian's dspGuru, CORDIC FAQ, website, http://www.dspguru.com/info/faqs/cordic2.htm, printed on Oct. 2, 2006.
John G. Proakis, Digital Communications Fourth Edition, published by McGraw-Hill 2001.

* cited by examiner

*Primary Examiner*—Shuwang Liu
*Assistant Examiner*—Gina McKie
(74) *Attorney, Agent, or Firm*—K&L Gates LLP

(57) ABSTRACT

In one embodiment a wireless communication device is provided that: acquires a phase rotation angle in the propagation channel which phase rotation angle is contained in a received symbol and that performs rotation compensation of the acquired phase rotation angle for the received symbol; generates a coordinate value of the respective I, Q axis in the signal constellation on which the information of the respective reference signal point is set; for the respective transmission bit, obtains respective probabilities that the transmission bit is 0 and 1 by making a distance determination of the distance between the received symbol after the rotation compensation and the respective reference signal level on only one of the I and Q axes; and makes a likelihood determination of the bit value of the respective transmission bit in accordance with a probability value obtained.

11 Claims, 15 Drawing Sheets

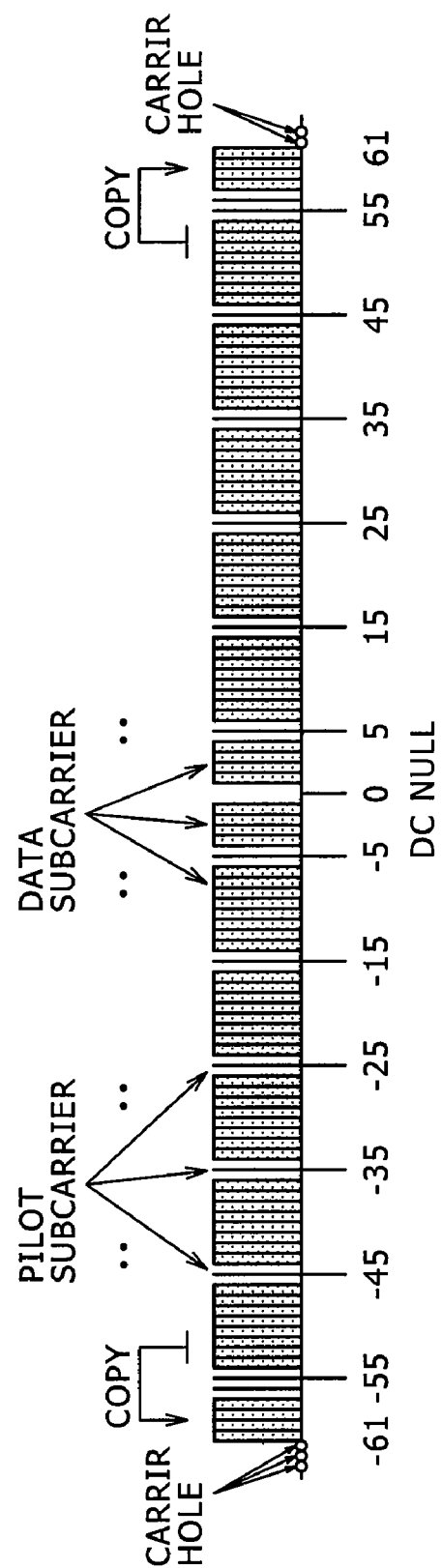

FIG.10
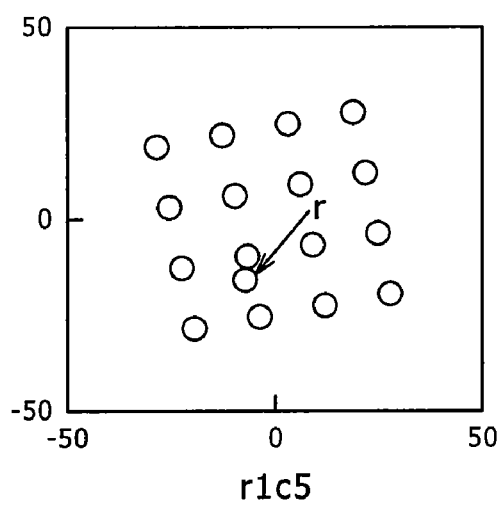
r1c5
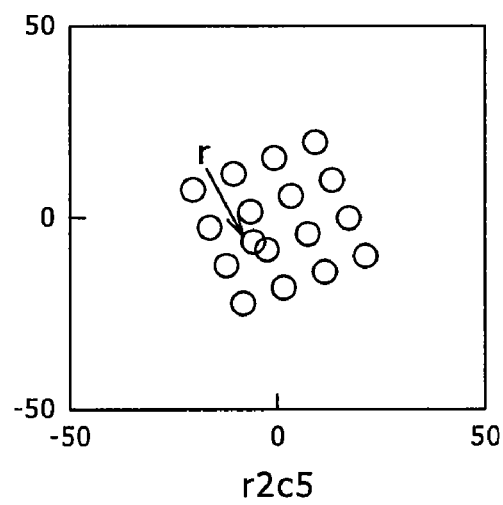
r2c5
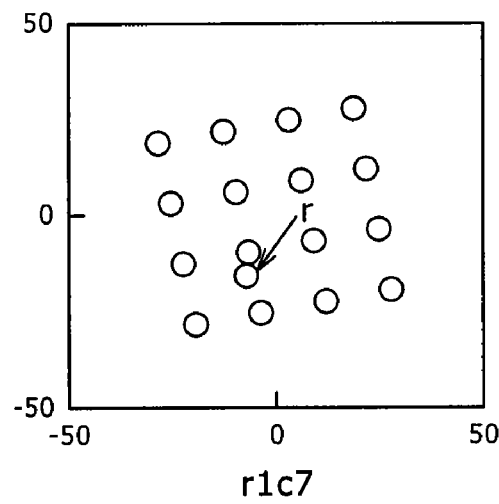
r1c7
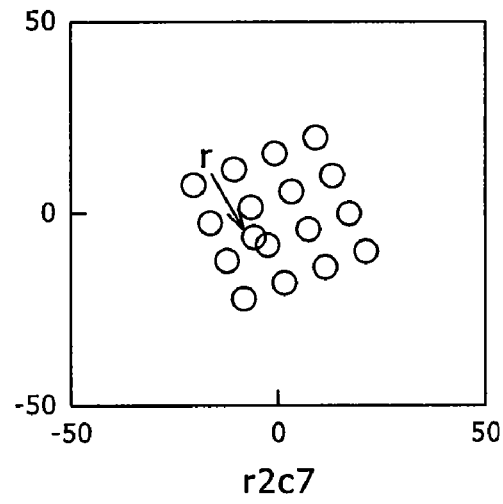
r2c7

FIG.11
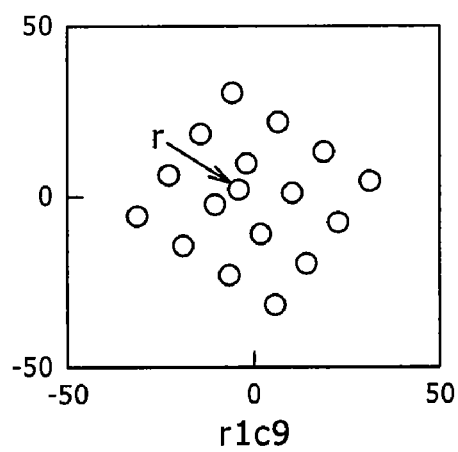
r1c9
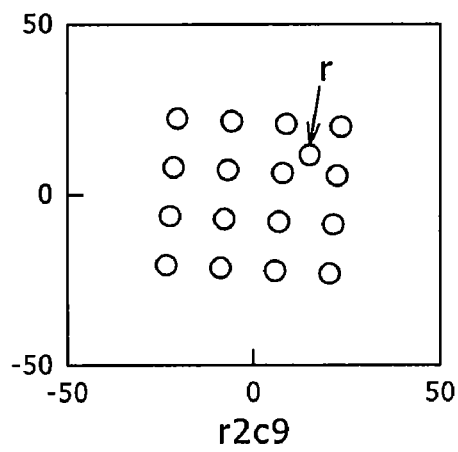
r2c9
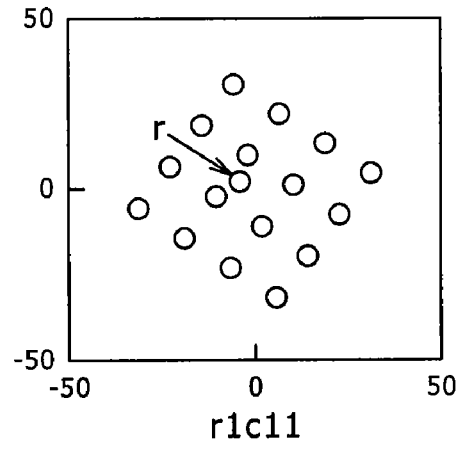
r1c11
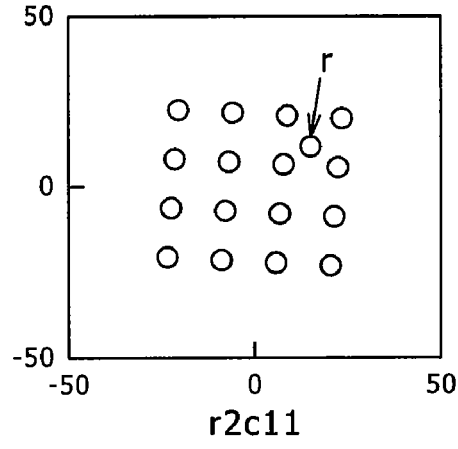
r2c11

FIG.12
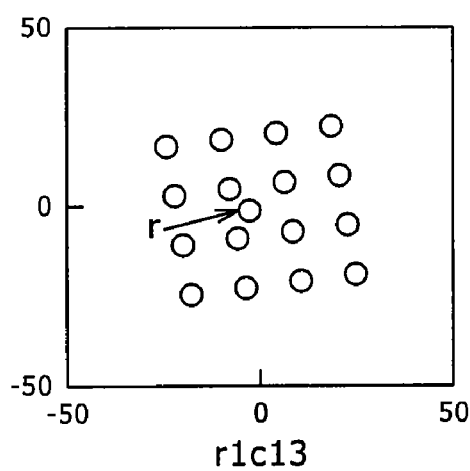
r1c13
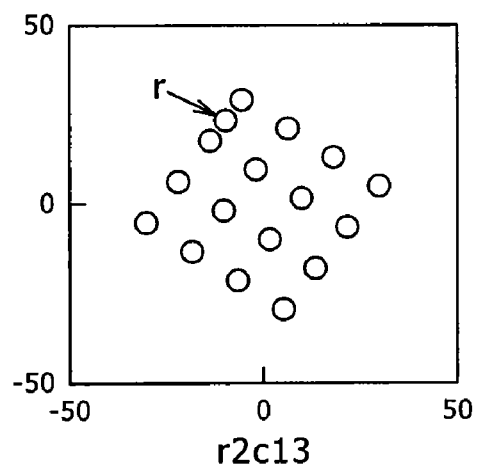
r2c13
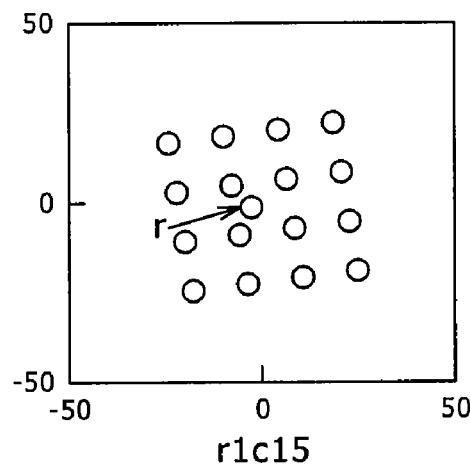
r1c15
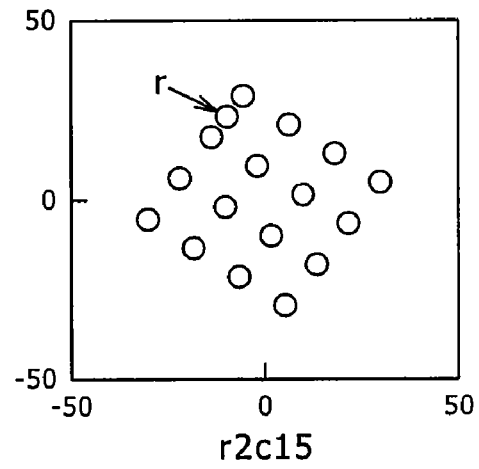
r2c15

FIG.13
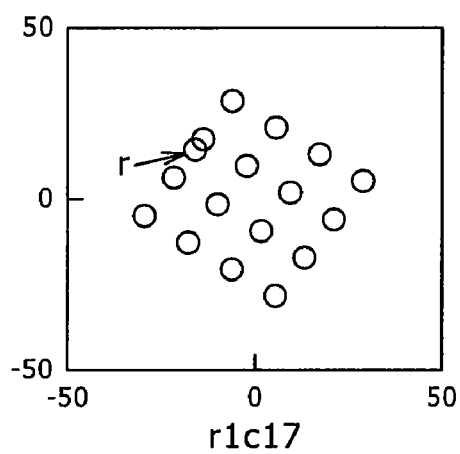
r1c17
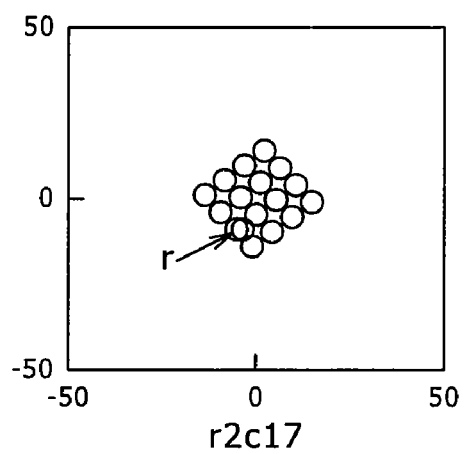
r2c17
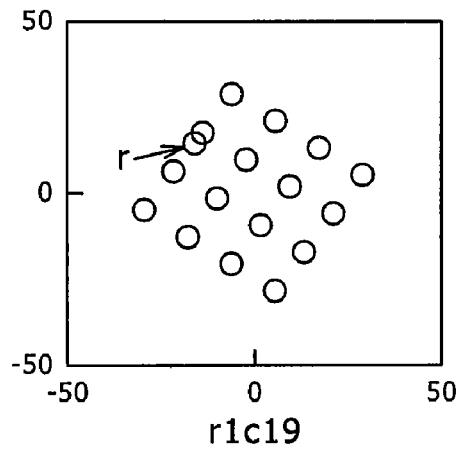
r1c19
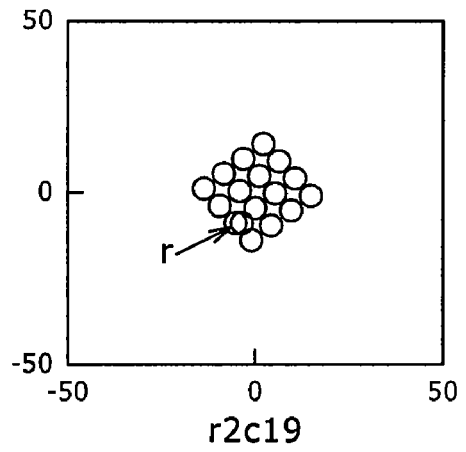
r2c19

WIRELESS COMMUNICATION APPARATUS,
WIRELESS COMMUNICATION METHOD
AND COMPUTER PROGRAM THEREFOR

CROSS REFERENCES TO RELATED APPLICATIONS

The present application claims priority to Japanese Patent Application JP 2005-261665 filed in the Japanese Patent Office on Sep. 9, 2005, the entire contents of which being incorporated herein by reference.

BACKGROUND

The present application relates to a wireless communication device, a wireless communication method, and a computer program that performs a receive process of an ultra-wideband ("UWB," hereafter) signal using a very wide frequency band. More specifically, the invention relates to a wireless communication device, a wireless communication method, and a computer program that respectively perform demodulation of a received multi-level modulated signal through a reduced number of calculations.

More specifically, the invention relates to a wireless communication device, a wireless communication method, and a computer program that perform the demodulation of a received multi-level modulated symbol by performing likelihood determination with respect to a reference signal point in a signal constellation through a reduced number of calculations. Yet more specifically, the invention relates to a wireless communication device, a wireless communication method, and a computer program that respectively simplify calculations for calculating the likelihood of a received QAM mapped symbol with respect to a respective reference symbol in a signal constellation.

FIG. 3 shows example frequency mapping specified relative to multiband OFDM UWB ("MB-OFDM," hereafter) communication systems (see, "MBOFDM PHY Specification Final Release 1.0," Wimedia Alliance, Apr. 27, 2005). In the example shown therein, a 5-GHz zone to be used by a wireless LAN is set to a null band, and the other zone is divided into 13 subbands. The subbands are divided into four groups A to D, whereby communication is performed by managing the frequency in units of the group.

FIG. 4 shows a state of data transmission being performed in MB-OFDM through frequency hopping with respect to OFDM symbols on a time axis. More specifically, in the shown example, a group A of bands #1 to #3 is used, and OFDM modulation using an IFFT (inverse fast Fourier transform)/FFT (fast Fourier transform) composed of 128 points is carried out via frequency hopping being performed while the central frequency is varied in units of one OFDM symbol.

FIG. 5 is a diagram showing 128 subcarriers in an OFDM symbol. In the diagram, 128 subcarriers in one OFDM symbol are shown, and the subcarriers correspond to one subband in FIG. 3 and one symbol frequency-hopped in FIG. 4. As shown in FIG. 3, in MB-OFDM, of 128 pieces of subcarriers, 100 pieces are used as data subcarriers for carrying transmission data, 12 pieces are used as pilot subcarriers for carrying well-known pilot signals, and six pieces are used as carrier holes (that is, subcarriers not having energy). Five pieces each of subcarriers located internally of carrier holes on both sides are used as dummy subcarriers that do not carry information, and five pieces are generated by copying from the end portion of the data subcarrier.

Table 1 below summarizes values used in the MB-OFDM, such as, for example, transmission rates, modulation schemes allocated for the respective transmission rates, and coding rates.

TABLE 1

| Transmission Rate [Mbps] | Modulation Scheme | Coding Rate [R] | Conjugate Symmetry Input for IFFT | Time Spreading Factor [TSF] | Segment Spread Gain | $N_{CBPS}$ |
|---|---|---|---|---|---|---|
| 39.4 | QPSK | 17/69 | Yes | 2 | 4 | 100 |
| 53.3 | QPSK | 1/3 | Yes | 2 | 4 | 100 |
| 80 | QPSK | 1/2 | Yes | 2 | 4 | 100 |
| 106.7 | QPSK | 1/3 | No | 2 | 2 | 200 |
| 160 | QPSK | 1/2 | No | 2 | 2 | 200 |
| 200 | QPSK | 5/8 | No | 2 | 2 | 200 |
| 320 | DCM | 1/2 | No | 1 | 1 | 200 |
| 400 | DCM | 5/8 | No | 1 | 1 | 200 |
| 480 | DCM | 3/4 | No | 1 | 1 | 200 |

* NCBPS: Coded bits per OFDM symbol

As shown in Table 1, the following modulation schemes are used in MB-OFDM. The QPSK (quadrature phase keying) modulation scheme is used for the transmission rates in the range of from 39.4 Mbps to 200 Mbps, and the DCM (dual-carrier modulation) scheme configured by combining frequency diversity scheme with 16 QAM (16 quadrature amplified modulation) scheme is used for the transmission rates in the range of from 320 Mbps to 480 Mbps. In the table, 80 Mbps and 160 Mbps are optional transmission rates.

QPSK and 16 QAM are general modulation schemes in respect of the multi-level modulation scheme that maps a multibit binary signal into a specific point in a signal constellation. For example, in the QPSK, a 2-bit binary signal is mapped into four signal points (transmission symbols) each having a different phase in the signal constellation corresponding to the combination of the 2-bit value of the binary signal. In 16 QAM, a 4-bit binary signal is mapped into 16 signal points each created by using a combination of phase and amplitude in the signal constellation corresponding to the combination of the 4-bit value of the binary signal.

In the DCM scheme, in the event of 16 QAM is used as the modulation scheme, of a total of 100 data subcarriers, data is superimposed onto 50 data subcarriers, and the same data is redundantly superimposed onto the remaining 50 data subcarriers. That is, the same information is divided for two carriers and transmitted thereover. In this case, both streams of data can be synthetically received and reproduced on the receiver side, therefore making it possible to obtain the effects of frequency diversity. In Table 1, while the coded bits per OFDM symbol are shown, 200 information bits are arrayed in one OFDM symbol for the rate higher or equal to 320 Mbps. In the 16 QAM scheme, four bits can be transmitted with one symbol. A 16-QAM symbol is generated as shown in Expressions (1) to (3) below.

$$d(k) = Sym1(b[g(k)], b[g(k)+1], b[g(k)+50], b[g(k)+51]) \quad (1)$$

$$d(k+50) = Sym2(b[g(k)], b[g(k)+1], b[g(k)+50], b[g(k)+51]) \quad (2)$$

$$g(k) = \begin{cases} 2k & k \in [0, 24] \\ 2k+50 & k \in [25, 49] \end{cases} \quad (3)$$

Expression (1) is used to generate a reference symbol that is adapted for the first-half 50 subcarriers in the event the same information is separated for two carriers and transmitted thereover by the DCM scheme. Expression (2) is used to generate a reference symbol that is adapted for the second-half 50 subcarriers. In the expressions, b[x](0≦x<200) represents 200 information bits, and g(k) represents an index for selecting four bits from 200 bits. Sym1(a, b, c, d) and Sym2(a, b, c, d) are functions for generating a complex-number representing symbol from the same four bits a to d. Respective 16-QAM mappings in the first-half 50 subcarriers and second-half 50 subcarriers have constellation characteristics as shown in FIGS. 6A and 6B. In the event the same information is separated for two carriers and transmitted thereover by the DCM scheme, different 16-QAM mapping processes are performed, such that information of the same four bits are mapped into different transmission symbols (although different 16-QAM mapping processes, the information to be transmitted (or, "transmission information," hereafter) is the same).

The OFDM symbol contains 100 data subcarriers (described above). In DCM, 100 symbols d(0) to d(99) are OFDM modulated and then are transmitted. FIG. 7 shows a DCM subcarrier array.

In the event that, as described above, the transmitter performs mapping of the multibit binary signal into the signal constellation and thereby performs data transmission thereof, the receiver side has to perform demodulation for returning the received signal from the signal point to the original multibit binary signal.

As a demodulation scheme corresponding to the QAM scheme, a scheme called "LLR-used demodulation scheme" (LLR: log-likelihood ratio) is known (see, J. G. Proakis, "Digital Communications (Fourth Edition)," McGraw-Hill, 2001), for example. The LLR-used demodulation scheme calculates distances between received symbols and respective reference symbols to obtain most closest signal points, and performs demapping thereof in accordance with the calculation results. More specifically, in the LLR-used demodulation scheme, calculations are necessary to search for a signal point closest to a received symbol in the signal constellation. For example, in 16 QAM in which transmission bits b0, b1, b2, and b3 are mapped into 16 points in the signal constellation, an expression for demapping the transmission bit b0 is represented as shown below (Expression (4)).

$$LLR = \log\left(\frac{P(y1, y2|b0=1)}{P(y1, y2|b0=0)}\right) \quad (4)$$
$$= \log(P(y1, y2|b0=1)) - \log(P(y1, y2|b0=0))$$

In the above:

$$P(y1, y2|b0=1) = \sum_{b0=1} \frac{1}{\sqrt{2\pi\sigma^2}} \exp\left(-\frac{|y1-a1\cdot s1|^2 + |y2-a2\cdot s2|^2}{2\sigma^2}\right) \quad (5)$$

$$P(y1, y2|b0=0) = \sum_{b0=0} \frac{1}{\sqrt{2\pi\sigma^2}} \exp\left(-\frac{|y1-a1\cdot s1|^2 + |y2-a2\cdot s2|^2}{2\sigma^2}\right) \quad (6)$$

In this case, y1 and y2, respectively, are received symbols corresponding to transmission symbols x1 and x2 obtained in the manner that the same transmission information x is separated for two carriers and subjected to two different 16-QAM mapping processes; a1 and a2 are complex impulse responses of propagation channels that have been measured for the respective carriers; and s1 and s2, respectively, are 16-QAM signal points serving as references, and $\sigma^2$ is a noise power. Demapping of the other transmission bit b1, b3 can be represented by a similar expression, but it is omitted from here.

Expression (5) is an expression for calculating a likelihood that a transmission bit b0 of the received symbol (y1, y2) is 1. More specifically, the likelihood is calculated for the respective signal point (s1, s2) in which b0=1, a distance on a complex plane between the received symbol (y1, y2) and a complex symbol (a1·s1, a2·s2) representing "b0=1" is obtained, and the distances are summed. FIG. 8 shows the relationships between transmission signal constellations and transmission bits. The symbols in which b0=1 in Expression (5) correspond to reference signal points mapped into portions indicated with "b0=1" in two signal constellations y1 and y2 shown in FIG. 8, and correspond to eight symbols in 16 QAM.

Similarly, Expression (6) is an expression for calculating a likelihood that a transmission bit b0 of the received symbol (y1, y2) is 0. More specifically, the likelihood is calculated for the respective signal point (s1, s2) in which b0=0, a distance on a complex plane between the received symbol (y1, y2) and a complex symbol (a1□s1, a2□s2) representing "b0=0" is obtained, and the distances are summed. The symbols in each of which b=0 in Expression (6) correspond to reference signal points mapped into portions indicated with "b0=0" in two signal constellations y1 and y2 shown in FIG. 8, and correspond to eight symbols in 16 QAM.

In the step of the LLR calculation shown in Expression (4), "b0=1" or "b0=0" is selected so that an after-reception posteriori condition probability is maximized. More specifically, when the respective probabilities that b0=1 and b0=0 are calculated for the received symbol (y1, y2) in accordance with Expressions (5) and (6), logarithmic conversions and a subtraction is carried out in Expression (4). Thereby, a soft determination value can be obtained.

Also for the bit value of respective one of the other bit positions b1 to b3, LLR calculations similar to the above are carried out and the soft determination is made, thereby making it possible to demap the received symbols (y1, y2) to highest-probability reference signal points.

FIGS. 9 to 13 each show the state where received 16-QAM symbols are demodulated. In each of the states as shown in the views, the amplitude and the rotation are imparted to 16 grating points corresponding to 16-QAM reference symbols in the transmission signal constellation in accordance with a predicted channel impulse response and phase rotation amount, whereby 16 reference symbols are obtained. Then, a received symbol indicated by reference character r is plotted, and a closest reference symbol is detected, and demapping of transmission bits is carried out.

According to Expression (4), the bit values of the respective transmission bits b0 to b3 are subjected to likelihood determinations in accordance with the results of the calculations of the distances between the received symbol and 16 closest reference symbols, whereby the 16-QAM demodulation is carried out. It is known that Expression (4) is an expression for completely demodulating a received symbol, and optimal characteristics can be obtained according to the LLR-used demodulation scheme.

FIG. 14 is a schematic view of a circuit configuration that executes the demodulation of a received 16-QAM mapped symbol by using the LLR-used demodulation scheme. As can be seen in FIG. 14 as well, in the LLR-used demodulation scheme, a drawback exists in that since calculations of, for example, exp ( ) and a summing circuit are involved, the circuit size has to be increased, in which there arises a technical problem of how to simplify the calculations.

In the MB-ODFM communication scheme under study in conjunction with IEEE 15.3, frequency diversity is used in DCM. In this case, the same information x is separated for two carriers, and distinct 16-QAM mapping processes are carried out for the respective streams of the information (see FIGS. 6A and 6B), and the streams of the information are transmitted as distinct transmission symbols (x1, x2). As such, whereas it is sufficient for ordinary 16 QAM to process one received symbol, it is necessary for MB-OFDM to two received symbols (y1, y2) to demodulate the single bit b0, as shown in Expressions (5) and (6). Thus, with the DCM scheme being employed, since the number of calculations for demodulation is doubled, such that the issue of the circuit size becomes even more serious.

Further, in Expression (5), "exp(−x)" exponent calculations are carried out for the respective eight 16-QAM reference symbols, and the calculation results are summed (see FIG. 14). When the value of x is large, the result of calculation of exp(−x) is very small to a negligible extent. As such, in Expression (5), the calculation of $(y1-a1 \cdot s1)^2$ is carried out for the symbol in which b0=1, only the value of $(y1-a1 \cdot s1)^2$ to be minimum is used, but other values are set to 0, thereby making it possible to significantly reduce the number of calculations necessary in the LLR-used modulation scheme (see, Japanese Unexamined Patent Application Publication No. 2002-330188, par. 0015). Expression (7) below is an expression used in a scheme of that type to obtain the probability that the transmission b0=1. In Expression (7), Min represents a function for selecting the minimum value. Also the Expression (6) for obtaining the probability of a transmission bit having "b0=0" can be substituted with a similar expression. Further, a similar expression can be used for each of the other transmission bits b1 to b3, but presentation thereof is omitted herefrom.

$$P(y1,y2|b0=1)=\text{Min}\{|y1-s1 \cdot a1|^2+|y2-s2 \cdot a2|^2\} \quad (7)$$

Nevertheless, however, a problem arises with Expression (7) in that since complex multiplication operations and division operations are necessary, the circuit size has to be increased. FIG. 15 is a schematic view of a circuit configuration for demodulating received 16-QAM mapped symbols by using Expression (7). As can be seen in the drawing figure, squaring devices are necessary corresponding in number to symbols (eight in the case of 16 QAM).

SUMMARY

It is desirable to provide a high-quality wireless communication device, wireless communication method, and computer program that are capable of performing likelihood determination and demodulation of a received multi-level modulated symbol to reference signal points in a signal constellation through a reduced number of calculations.

It is further desirable to provide a high-quality wireless communication device, wireless communication method, and computer program that are capable of simplifying calculations to calculate a likelihood of a received QAM mapped symbol with respect to respective reference symbols in a signal constellation.

The present disclosure addresses the above described. In one embodiment a wireless communication device is provided that receives a transmission signal through a propagation channel and that performs a demodulation process of the transmission signal, the transmission signal having been subjected to a multi-level modulation process that, corresponding to a combination of bit values, performs mapping of an n-bit binary signal $2^n$ to signal points created in a signal constellation by using a combination of phase and amplitude. In the multi-level modulation process, signal-point arrangement of reference symbols is made so that information of a respective one of transmission bits is set on one of an I axis and Q axis in an I,Q signal constellation, and the wireless communication device includes phase rotation compensating means that acquires a phase rotation angle in the propagation channel which phase rotation angle is contained in a received symbol and that performs rotation compensation of the acquired phase rotation angle for the received symbol; reference signal generating means that generates, as a respective reference signal level, a coordinate value of the respective I, Q axis in the signal constellation on which the information of the respective reference signal point is set; probability calculating means that, for the respective transmission bit, obtains respective probabilities that the transmission bit is 0 and 1 by making a distance determination of the distance between the received symbol after the rotation compensation and the respective reference signal level on only one of the I and Q axes; and determining means that makes a likelihood determination of the bit value of the respective transmission bit in accordance with a probability value obtained by the probability calculating means.

In the field of communication, multi-level modulation schemes, such as QAM schemes, are known. In these schemes, corresponding to the combination of the bit values, a multi-level binary signal is mapped into a plurality of signal points (that is, reference symbols) each created by using a combination of phase and amplitude.

For example, an "LLR-used demodulation scheme" (LLR: log-likelihood ratio) is known as a demodulation scheme for a received 16-QAM modulated signal mapped into 16 signal points each having a distinct combination of phase and amplitude in the signal constellation. According to the LLR-used demodulation scheme, ideal demodulation characteristics can be obtained. Nevertheless, however, in the step of calculations, when a bit value of a respective transmission bit is selected so that an after-received posteriori condition probability is maximized, calculations of, for example, exp( ) and a summing circuit are involved. As such, there is a disadvantage in that the number of calculations is very large to the extent that the circuit size has to be increased. With the DCM scheme being employed, the disadvantage becomes even more serious.

Further, the number of calculations is reduced in such a manner that, making use of the fact that, when the value of x is large, the result of calculation of exp(−x) is very small to a negligible extent, such that, when making the likelihood determination of a received symbol with respect to a reference symbol, only the distance from the reference symbol closest to the received symbol is used, and other values are set to 0. However, a problem still remains in that since complex multiplication operations and division operations are necessary, the circuit size has to be increased.

As such, according to one embodiment, making use of the fact that the respective bit of the transmission QAM symbol is set on one of the I and Q axes in the signal constellation, the information of the respective bit of the received data symbol is determined in accordance with the value of only one of the I and Q axes after compensating for the propagation channel rotation. In this case, it is sufficient to make the distance determination in accordance with the value of only one of the I and Q axes, therefore making it possible to significantly reduce the number of calculations.

By way of example, in a case where a multi-carrier modulation scheme, which is represented by OFDM, is employed as for the primary demodulation, a rotation angle of a predictive impulse response a1 pilot symbol a1 is first obtained by using a pilot symbol contained in an OFDM symbol. Then, the obtained rotation angle is adapted to a data symbol, thereby to compensate for the rotation corresponding to a1. For reverse rotation of the symbol, a circuit for calculating the arctan can be used.

If a circuit for obtaining the arctan and a circuit for obtaining an absolute value of the complex number for obtaining the absolute value of the predictive impulse response, respectively, can be simplified, the circuit size can be significantly reduced.

For example, a scheme is used by employing a complex calculation scheme called "CORDIC" for concurrently obtaining the arctan and the absolute value of the predictive impulse response, thereby enabling it to implement the simplification of the demodulating circuit. In this case, in the step of calculating the arctan by using CORDIC, a processing delay can be reduced by applying the result of the calculation performed for the pilot symbol to the data symbol as well.

A second embodiment includes a computer program written in a computer-readable format to execute, in a computer system, a process that receives a transmission signal through a propagation channel and that performs demodulation of the transmission signal, the transmission signal having been subjected to a multi-level modulation process that, corresponding to a combination of bit values, performs mapping of an n-bit binary signal $2^n$ into signal points created in a signal constellation by using a combination of phase and amplitude. In the multi-level modulation process, signal-point arrangement of reference symbols is made so that information of a respective one of transmission bits is set on one of an I axis and a Q axis in an I,Q signal constellation. The computer program includes a phase rotation compensating step that acquires a phase rotation angle in the propagation channel which phase rotation angle is contained in a received symbol and that performs rotation compensation of the acquired phase rotation angle for the received symbol; a reference signal generating step that generates, as a respective reference signal level, a coordinate value of the respective I, Q axis in the signal constellation on which the information of the respective reference signal point is set; a probability calculating step that, for the respective transmission bit, obtains respective probabilities that the transmission bit is 0 and 1 by making a distance determination of the distance between the received symbol after the rotation compensation and the respective reference signal level on only one of the I and Q axes; and a determining step that makes a likelihood determination of the bit value of the respective transmission bit in accordance with a probability value obtained by the probability calculating step.

The computer program according to the second embodiment is created by defining a computer program written in a computer-readable format to implement a predetermined process on a computer system. In another expression, by installing the computer program according to the second embodiment in a computer system, cooperative operation is exhibited in the computer system, whereby effects similar to those of the wireless communication device according to the first embodiment can be secured.

A high-quality wireless communication device, wireless communication method, and computer program can be provided that are capable of performing likelihood determination and demodulation of a received multi-level modulated symbol to reference signal points in a signal constellation through a reduced number of calculations.

Further, according to one embodiment, a high-quality wireless communication device, wireless communication method, and computer program can be provided that are capable of simplifying calculations to calculate a likelihood of a received QAM mapped symbol with respect to respective reference symbols in a signal constellation. For example, the embodiment of the invention is adaptable to the event that frequency diversity is used with DCM and a received 16-QAM mapped signal is demodulated in accordance with the MB-OFDM communication scheme.

Further, according to one embodiment, the rotation amount (arctan) is obtained to thereby compensate for the rotation, whereby the demodulation can be implemented by using the value of only one of the I and Q axes. Consequently, the number of calculations can be significantly reduced.

Further, according to one embodiment, the complex calculation scheme called "CORDIC" is used to concurrently obtain the calculation result of the arctan dedicated for phase compensation and the absolute value of the predictive impulse response, thereby enabling it to implement significant simplification of the demodulating circuit. In this case, in the step of calculating the arctan by using CORDIC, the processing delay can be reduced by applying the result of the calculation performed for the pilot symbol to the data symbol as well.

The above-described and other features and advantages of the invention will be apparent from, for example, below-described embodiments and detailed description given in association with the accompanying drawings.

Additional features and advantages are described herein, and will be apparent from, the following Detailed Description and the figures.

BRIEF DESCRIPTION OF THE FIGURES

FIG. 5 is a view showing a subcarrier array in an OFDM symbol;

FIG. 10 is a view showing a state of demodulation of received 16-QAM symbols;

FIG. 11 is a view showing a state of demodulation of received 16-QAM symbols;

FIG. 12 is a view showing a state of demodulation of received 16-QAM symbols;

FIG. 13 is a view showing a state of demodulation of received 16-QAM symbols;

DETAILED DESCRIPTION

Embodiments will be described below with reference to the drawings.

The embodiments relate to a communication device that performs a receive process of a received signal multi-level modulated such as QAM modulated. More specifically, the embodiments relate to a QAM receiver configured to reduce the number of calculations necessary for a demodulating circuit to perform likelihood determination of a received symbol with respect to a reference symbol and to thereby perform demapping thereof. The embodiments are adaptable to the event of demodulating a received 16-QAM mapped signal in accordance with the MB-OFDM communication scheme.

As a demodulation scheme corresponding to QAM schemes, an LLR-used demodulation scheme is known that obtains ideal characteristics to thereby enable complete demodulation. In the step of the LLR calculation, a bit value of a respective transmission bit is selected so that an after-received posteriori condition probability is maximized. In this case, however, calculations of, for example, exp( ) and a summing circuit, such that there arises a drawback in that the number of calculations is very large to the extent that the circuit size has to be increased.

In order to solve such technical problems, the number of calculations for the likelihood determination is reduced, such that, when the value of x is large, the result of calculation of exp(−x) is very small. As shown in Expression (7), only the distance from the reference symbol closest to the received symbol in the received signal constellation is used, and other values are set to 0, thereby making it possible to significantly reduce the number of calculations necessary for the likelihood determination. Even in this case, there arises the problem in that since complex multiplication operations and division operations are necessary, the circuit size has to be increased.

Figure 8:
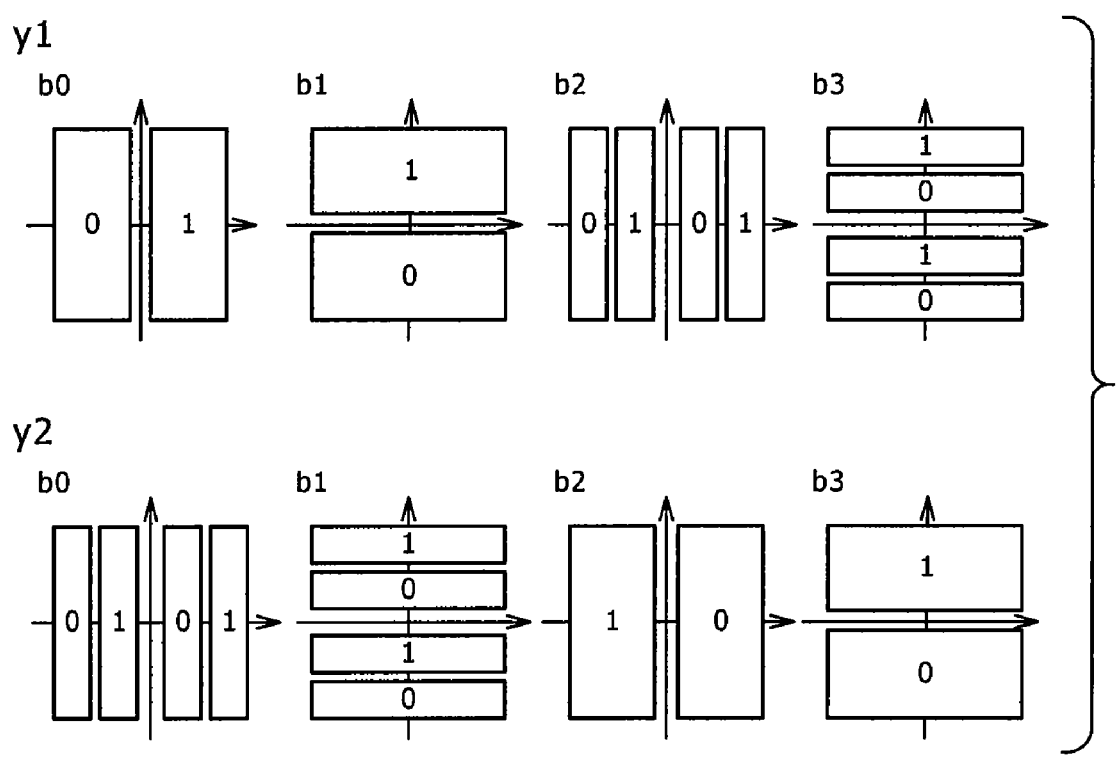
FIG. 8 is a view showing the relationship between the transmission signal constellation and the transmission bits.
Figure 9:
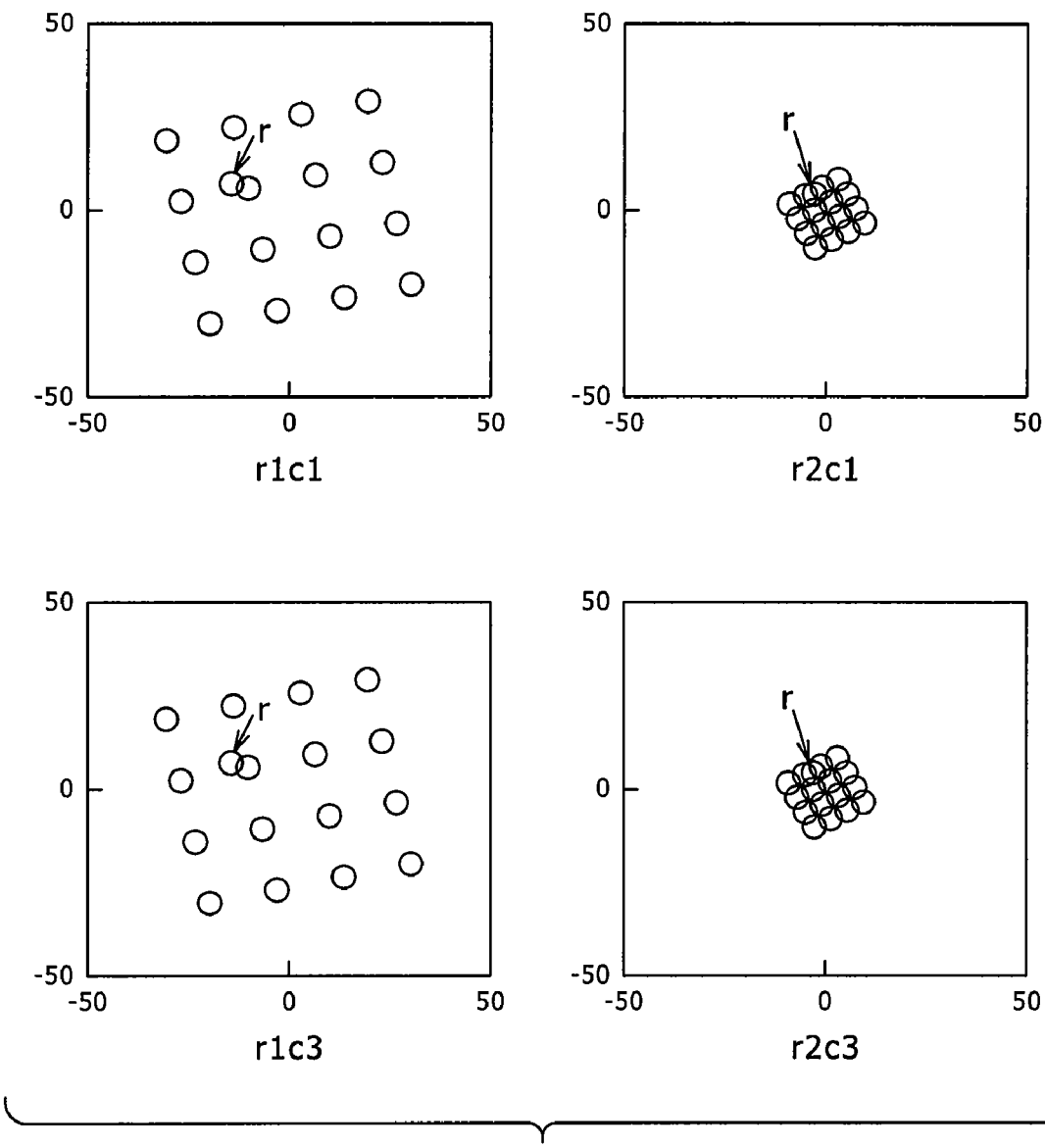
FIG. 9 is a view showing a state of demodulation of received 16-QAM symbols.
Figure 14:
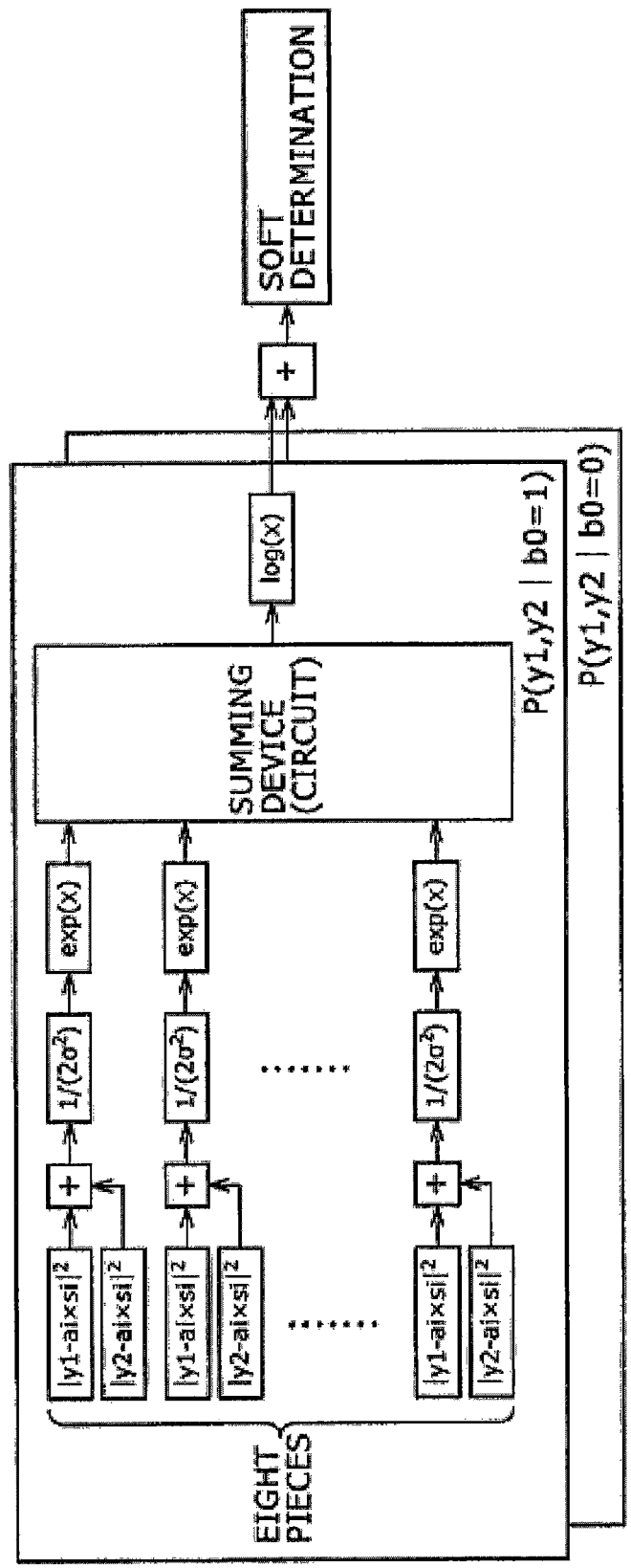
FIG. 14 is a schematic view of a circuit configuration that executes the demodulation of a received 16-QAM mapped symbol by using the LLR-used demodulation scheme.
Figure 15:
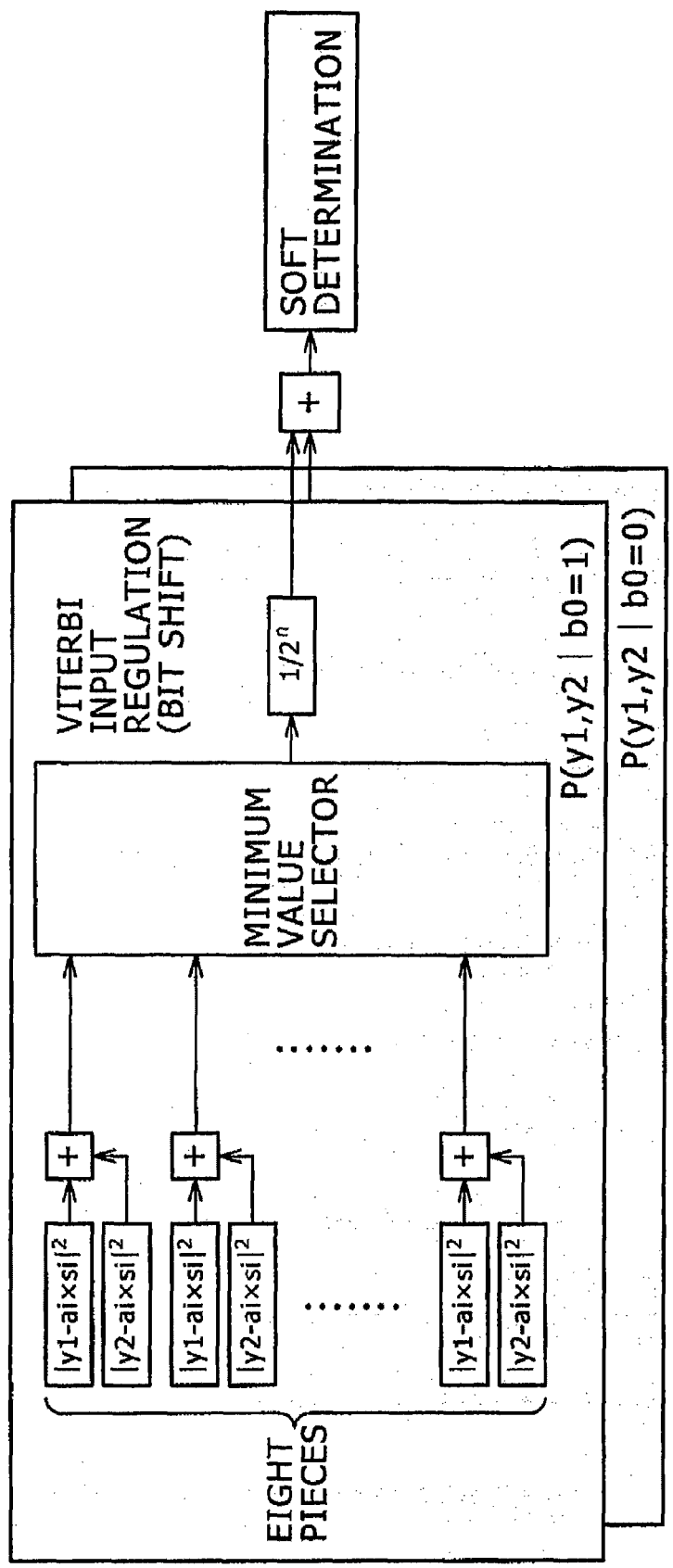
FIG. 15 is a schematic view of a circuit configuration that executes the demodulation of a received 16-QAM mapped symbol by using Expression (7)

The relationship between the transmission signal constellation and the transmission bits, as shown in FIG. 8, will now be discussed. The 16 QAM scheme is a scheme that maps a 4-bit transmission signal into 16 transmission symbols each created by using a combination of phase and amplitude in the constellation, in which it is arbitrary to map the respective 4-bit signal system into which one of the signal points. However, with reference to FIG. 8, it is shown that, in the case that the 16-QAM symbols are generated by using Expressions (1) to (3) described above, the information of the respective transmission bit b0, b1, b2, b3 (that is, information indicative whether the bit value is 0 or 1) is set on one of the I axis and the Q axis in the signal constellation. For example, in the case of y1, for the bit b0, b2, it is possible to determine whether the bit value is 0 or 1 by reference to only the I axis component (that is, only by comparison with a reference level value (±1, ±3) on the I axis). Similarly, for the bit b1, b3, it is possible to determine whether the bit value is 0 or 1 by reference to only the Q axis component (that is, only by comparison with a reference level value (±1, ±3) on the Q axis).

The received symbol is imparted the rotation and the amplitude with a respective impulse response and phase rotation amount associated with distortion of the propagation channel. As such, in the transmission symbol, in the received symbol, although the information of the respective bit is set on one of the I and Q axes, the information of the respective bit is separated for the I axis component and the Q axis component corresponding to the phase rotation amount associated with the propagation channel.

Taking the above into account, operation is performed as described below according to one embodiment. In a QAM receive operation, at the outset, the phase rotation amount associated with the propagation channel distortion is obtained. Then, the rotation of the propagation channel is compensated for by reversely rotating the received symbol corresponding to the phase rotation amount, whereby the information of the respective bit of the received symbol is determined in accordance with a value of only one of the I and Q axes. In this case, when detecting a closest reference symbol in the received signal constellation, the complex calculation of the distance between the received symbol and the respective reference symbol need not be carried out, but it is sufficient to make the distance determination in accordance with the value of only one of the I and Q axes. Consequently, compared to Expression (7), the number of calculations for the demodulation is reduced.

More specifically, at the outset, a rotation angle of a predictive impulse response a1 is obtained by using a pilot symbol contained in the OFDM symbol. Then, the obtained rotation angle is adapted for a data symbol to thereby compensate for the rotation corresponding to a1. A circuit for calculating the arctan (arctangent) can be used to reversely rotate the symbol. In this case, an expression for obtaining the probability that the transmission bit b0=1 can be represented as Expression (8) shown below.

$$P(y1, y2|b0 = 1) = \text{Min} \quad \{\|y1 \cdot \exp(-j\arg(a1)) - s1 \cdot |a1|\|^2 + \|y2 \cdot \exp(-j\arg(a2)) - s2 \cdot |a2|\|^2\} \quad (8)$$

In Expression (8) shown above, arg(x) represents the declination of the complex number "x=a+jb", and is assumed to represent the value of arctan(b/a). In the complex number, the relational expression "|x|=|x×exp (−jφ)|" is established, such that it can be said that Expression (8) is equivalent to Expression (7). Further, for example, when transmission bit b0=0 and for the respective other transmission bits b1 to b3, a similar expression can be used, such that the presentation thereof is omitted herefrom.

As described above, in accordance with the compensation for the rotation amount associated with the propagation channel, the demodulation can be carried out by the determination of the distance on only one of the I and Q axes for the respective one of the transmission bits b0 to b3. If a circuit for obtaining the arctan and a circuit for obtaining the absolute value of the complex number, respectively, can be simplified, the size of the modulating circuit can be significantly reduced.

The present embodiments employ a complex calculation scheme called "CORDIC" (acronym of COordinate Rotation DIgital Computer) for concurrently obtaining the arctan and the absolute value of the predictive impulse response, thereby enabling it to implement the simplification of the demodulating circuit. In this case, in the step of calculating the arctan by using CORDIC, a processing delay can be reduced by applying the result of the calculation performed for the pilot symbol to the data symbol as well.

The calculation scheme called CORDIC will be described herebelow.

Figure 16:
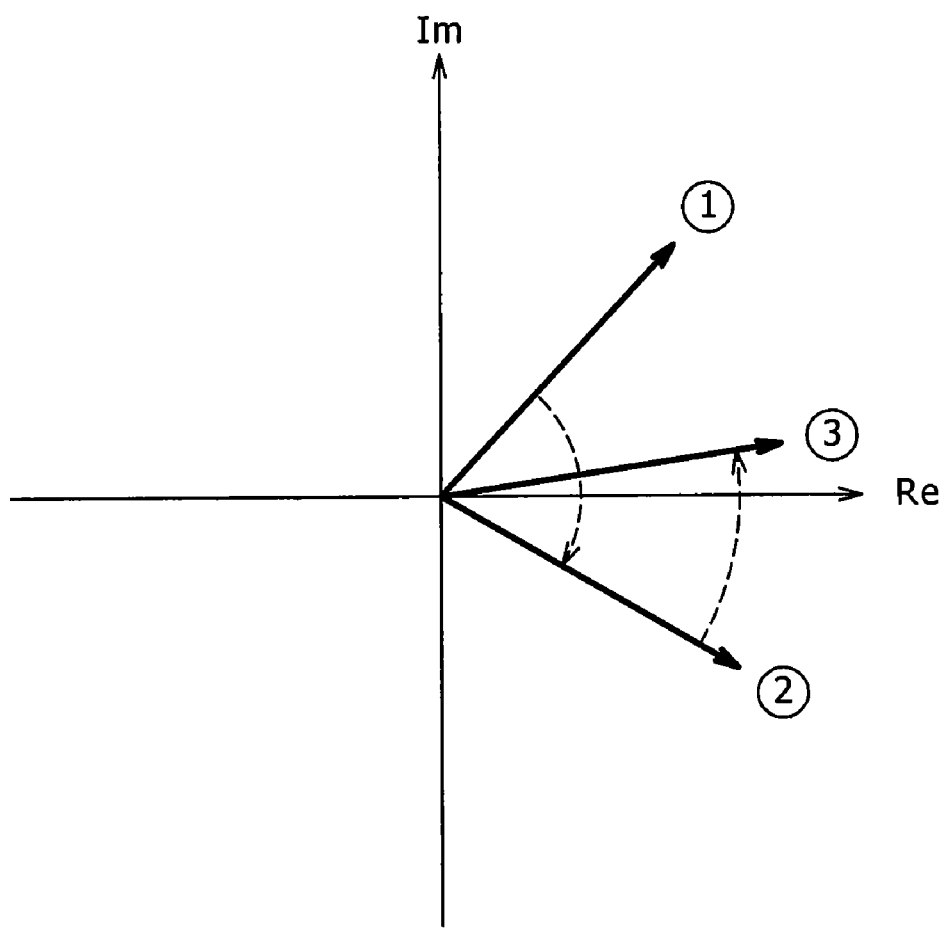
FIG. 16 is a view showing a state in which a complex number is converged onto a real axis through iterative calculations performed by CORDIC (Coordinate Rotation Digital Computer).

CORDIC is a calculation scheme disclosed in a thesis by Volder in 1959, and is primarily used to obtain, for example, trigonometric functions and square roots. For CORDIC itself, refer to, for example, "CordicFAQ (http://www.dspguru.com/infor/faqs/cordic.htm).

to the real axis. FIG. 16 shows a state in which a complex number is converged to the real axis through iterative calculations.

Although the value of $|(1+j\alpha k)|$ is thus iteratively used, as the multiplier, corresponding to the number of times of iterated calculations, the convergence is achieved to "$\Pi|(1+j\alpha k)|=1.6467602581\ldots,$" independent of the rotation direction, which is called "CORDIC Gain."

As can be understood from Expressions (9) and (10), CORDIC is configured of only addition operations and bit-shifts, it has the advantage of reducing the circuit size, compared to schemes that uses multiplication operations and tables, for example.

Table 2 shows calculation results of the arctan obtained by using CORDIC. Shown in the table is an example in which the arctan the complex number "43+j22" is calculated. In the rightmost portion corresponding to "i=15" in the table, there is shown the arctan calculation result "−27.09769158." It can be known that the value is very close to a correct value shown with "verific." below the table.

TABLE 2

| i | L | real arg. $a_i$ | imag. arg. $b_i$ | $b_i > 0?$ --> sign | $k_i$ | $\operatorname{atan}(k_i)$ in ° | "+/−90 + ° ($\operatorname{atan}(k_i)$)" |
|---|---|---|---|---|---|---|---|
| 1 |   | 43 | 22 | −1 |   |   | −90 |
| 2 | 0 | 22 | −43 | 1 | 1 | 45 | −45 |
| 3 | 1 | 65 | −21 | 1 | 0.5 | 26.5650512 | −18.43494882 |
| 4 | 2 | 75.5 | 11.5 | −1 | −0.25 | −14.0362435 | −32.47119229 |
| 5 | 3 | 78.375 | −7.375 | 1 | 0.125 | 7.12501635 | −25.34617594 |
| 6 | 4 | 79.296875 | 2.421875 | −1 | −0.0625 | −3.57633437 | −28.92251032 |
| 7 | 5 | 79.44824219 | −2.53417969 | 1 | 0.03125 | 1.78991061 | −27.13259971 |
| 8 | 6 | 79.5274353 | −0.05142212 | 1 | 0.015625 | 0.89517371 | −26.237426 |
| 9 | 7 | 79.52823877 | 1.19119406 | −1 | −0.0078125 | −0.44761417 | −26.68504017 |
| 10 | 8 | 79.53754498 | 0.56987969 | −1 | −0.00390625 | −0.2238105 | −26.90885067 |
| 11 | 9 | 79.53977107 | 0.25918616 | −1 | −0.00195313 | −0.11190568 | −27.02075635 |
| 12 | 10 | 79.54027729 | 0.10383504 | −1 | −0.00097656 | −0.05595289 | −27.07670924 |
| 13 | 11 | 79.54037869 | 0.02615899 | −1 | −0.00048828 | −0.02797645 | −27.10468569 |
| 14 | 12 | 79.54039147 | −0.01267909 | 1 | 0.00024414 | 0.01398823 | −27.09069746 |
| 15 | 13 | 79.54039456 | 0.00673995 | −1 | −0.00012207 | −00.00699411 | −27.09769158 |
|   |   | verific. | tan (°) = $b_i/a_i$ | | atan (°) | | |
|   |   |   | 0.51162791 | | 27.0955525 | | |

A CORDIC algorism is represented as Expressions (9) and (10) shown below. In Expression (10), $k=\frac{1}{2^n}$.

$$h_n = a + jb \quad (9)$$

$$h_{n+1} = (a + jb) \cdot (1 + j\alpha k) \begin{cases} \alpha = 1 & \text{when } \operatorname{Im}\{h_n\} < 0 \\ \alpha = -1 & \text{when } \operatorname{Im}\{h_n\} > 0 \end{cases} \quad (10)$$

In CORDIC, the calculations are carried out through iterations of Expressions (9) and (10). Basically, a complex number $h_n$, desiring to obtain the arctan is multiplied by a rotation element $(1+j\alpha k)$, and the multiplication operation is iterated until the angle of $h_n$ reaches 0 degree. In Expression (10) shown above, the parameter of $\alpha$ indicates the direction defining the rotation. When the value of Expression (9) corresponds to a first quadrant, the rotation is directed towards a fourth quadrant; and when the value corresponds to the fourth quadrant, the rotation is directed towards the first quadrant, whereby $h_n$ is converged to the angle of 0 degree with respect Thus, in the QAM demodulator circuit, which is configured to employ the embodiments, the operation is performed as follows. At the outset, a rotation angle of the predictive impulse response a1 is obtained by using the pilot symbol contained in the OFDM symbol. Then, the rotation is compensated for corresponding to a1 by adapting the obtained rotation angle to the data symbol, and information of the respective bit of the data symbol is determined in accordance with the value of only one of the I and Q axes. In addition, when reversely rotate the symbol, the circuit for calculating the arctan is used. In this case, CORDIC is used to concurrently obtain the calculated value of the arctan for phase compensation and the absolute value of the predictive impulse response. Further, the result of the calculation performed for the pilot symbol is adapted to the data symbol as well, whereby the processing delay is reduced.

Figure 1:
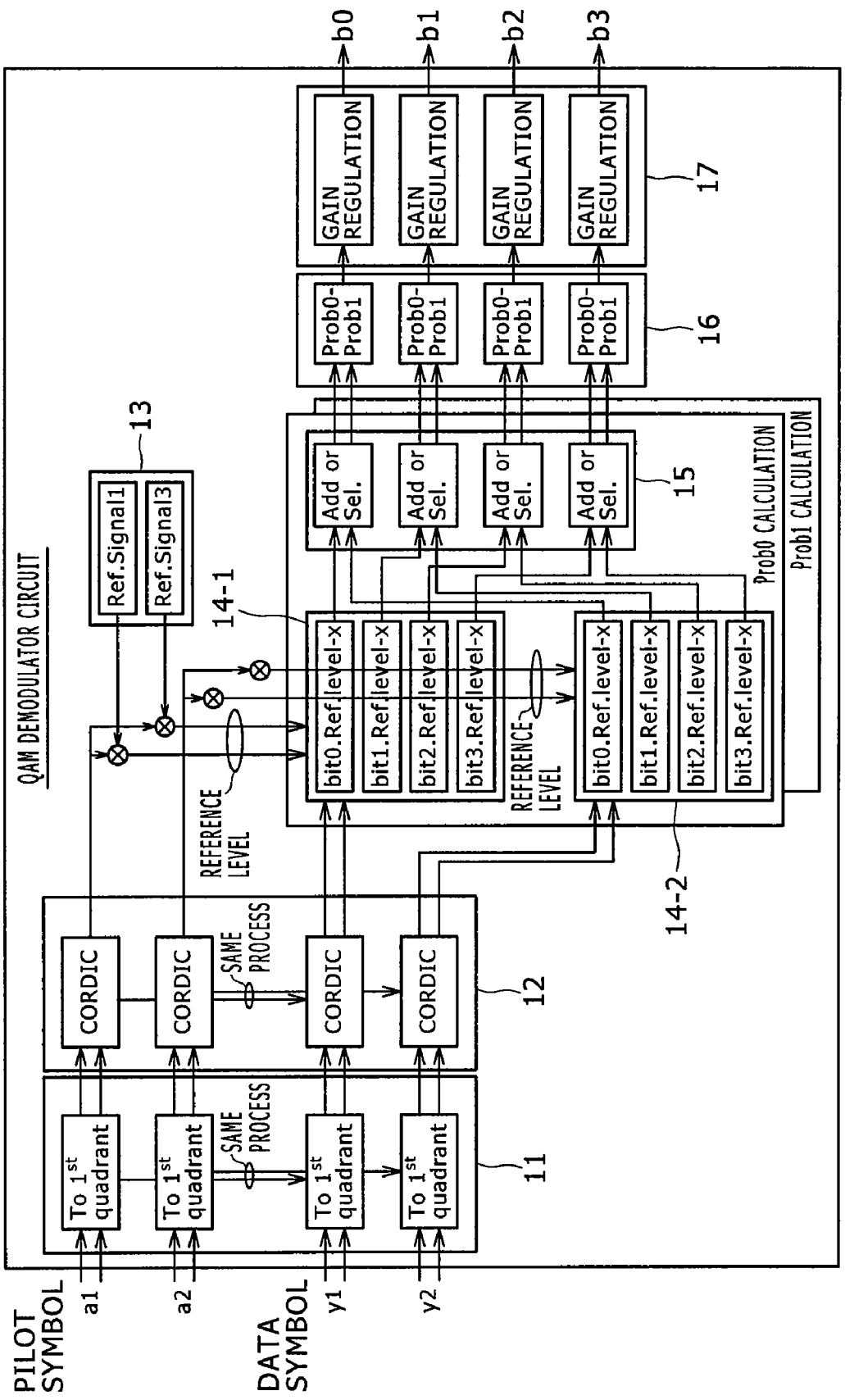
FIG. 1 is a view showing an exemplary configuration of a QAM demodulator circuit according to one embodiment.

FIG. 1 is a view showing an exemplary configuration of a QAM demodulator circuit according to one embodiment of the invention. The circuit shown in the drawing figure is configured to demodulate frequency-diversity combined, DCM-used 16-QAM OFDM symbols. The shown example is contemplated to receive two pilot symbols a1 and a2 (each being assumed to indicate the propagation-channel impulse response) and two data symbols y1 and y2 as inputs and to have soft decision values of four bits as outputs.

In the DCM scheme, the same information is separated for two carries and transmitted. When the pilot symbols a1 and a2, which are composed of the same information, are received, first, in a symbol rotating section 11, the respective symbol is rotated to a first quadrant (when not in the first quadrant, though). Thereafter, in a CORDIC calculation section 12, the calculation of the phase-compensation dedicated arctan and the calculation of the absolute value of a predictive impulse response are concurrently carried out by using CORDIC.

Subsequently, when the data symbols y1 and y2, which are composed of the same information, are received, similarly, in the symbol rotating section 11, the respective symbol are rotated to a first quadrant (when not in the first quadrant, though). Thereafter, in a CORDIC calculation section 12, compensation for the phase rotation in the propagation channel is carried out for the respective data symbol y1, y2 by using the CORDIC calculation scheme.

In this case, in the symbol rotating section 11, the same rotation amount of the pilot symbol a1, a2 is adapted to the respectively corresponding data symbol y1, y2, thereby to reduce the processing delay for the rotation to the first quadrant. Further, in the CORDIC calculation section 12, the arctan calculated through CORDIC for the pilot symbol a1, a2 is used to provide the phase compensation of the data symbol y1, y2, whereby the processing delay therefor is reduced.

From reference signal point s1, s2 in units of transmission bits b0, b1, b2, and b3 in 16 QAM, a reference signal level generation section 13 generates, as a respective reference signal level, a coordinate value of the respective I, Q axis on which information of a reference signal point s1, s2 is set. Where the inter-signal point distance is d on the I or Q axis, the respective 16-QAM reference signal levels take values "L1=1d" and "L2=3d." Further, the respective value is multiplied with the absolute value of the complex impulse response a1, a2, which has been obtained from the pilot symbol by the CORDIC calculation section 12, thereby to obtain a per-transmission-signal reference signal level for the use of distance calculation.

A distance calculation section 14 carries out distance calculation between the respective data symbol y1, y2 after the phase compensation (or, "post-phase compensation data symbol," hereafter) and the reference signal level in units of the transmission bit b0, b1, b2, b3. In this case, the respective post-phase compensation data symbol y1, y2 is in the state where it is set on one of the I and Q axes. As such, actually, the distance calculation is not the complex distance calculation, but is the calculation of value of only one of the I and Q axes, consequently simplifying arithmetic processing.

A combining section 15 combines the results of the distance calculations carried out for the data symbol y1, y2 in units of the transmission bit b0, b1, b2, b3. In the combining section 15, a method of combining two subcarriers can be selected from a maximum ratio combining method, an iso-gain combining method, and a selectively combining method, for example.

A likelihood determining section 16 obtains, from the combination results, probabilities that the bit values become 0 and 1 in units of the transmission bit b0, b1, b2, b3, thereby to make the likelihood determination. Smaller one of the I and Q axis values of the post-rotation data symbol is used as the likelihood for the respective transmission bit. Processes as described above are performed for two, separated first and second half subcarriers of the OFDM symbol, thereby to obtain likelihoods Prob0 and Prob1 that the respective transmission bit become 0 and 1. Then, Prob1 is subtracted from Prob0 in accordance with Expression (4).

A gain regulating section 17 carries out gain regulation and outputs the respective result as a decoding result obtained through soft determination. As described above, the respective gain is normalized in the likelihood determining section 16 by using the above-described amplitude gain called a "CORDIC gain" (=1.64 ... ) occurring after completion of the processing.

As described above, according to Expression (8) shown above, the transmission bit probability is obtained by using only the reference symbol with the minimum distance from the received symbol. However, in the circuit configuration shown in FIG. 1, Expression (8) is further modified to make the determination for only one of the I and Q axes, thereby to simplify decoding (or, decoding process). This is attributed to the fact that, when DCM signal point mapping has been performed in accordance with Expressions (1) to (3), since the signal point is set on one of the I and Q axes in the signal constellation (see FIG. 8), the complex distance need not be obtained, but the value of only one of the axes is used to thereby enable the demodulation.

When seeking for the bit value probability in the manner that rotation compensation is carried out for the data symbol y1, y2 by using the arctan calculated by using CORDIC, and concurrently, only the minimum difference between the received signal and the reference symbol is used in respective Expressions (5) and (6) shown above can be modified to Expressions (11) and (12) shown below. In addition, Expressions (4) for selecting "b0=0" or "b0=1" can be modified to Expression (13) shown below.

$$P(y1, y2|b0 = 1) = \text{Min}\{|\text{Re}\{y1 \cdot \exp(-j\arg(a1))\} - L1 \cdot |a1|\|^2 + |\text{Re}\{y2 \cdot \exp(-j\arg(a2))\} - L2 \cdot |a2|\|^2\} \quad (11)$$

$$P(y1, y2|b0 = 0) = \text{Min}\{|\text{Re}\{y1 \cdot \exp(-j\arg(a1))\} - L1 \cdot |a1|\|^2 + |\text{Re}\{y2 \cdot \exp(-j\arg(a2))\} - L2 \cdot |a2|\|^2\} \quad (12)$$

$$LLR(b0) = P(y1, y2|b0 = 1) - P(y1, y2|b0 = 0) \quad (13)$$

In this case, L1 and L2, respectively, are real values representing amplitude values of the transmission symbols s1 and s2 on one of the I and Q axes. In the case of 16 QAM, the values "L1=1d" and "L2=3d" are taken, where d is the distance between the signal points on one of the I and Q axes. Similar expressions can be used for the other transmission bits b1 to b3, such that presentation thereof is omitted herefrom.

Figure 6A:
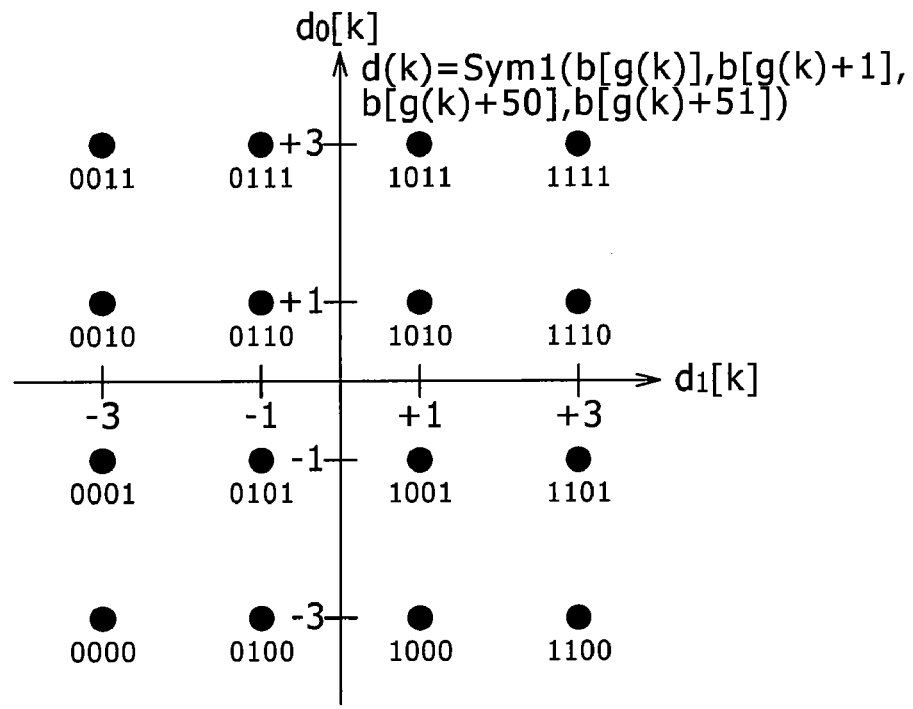
FIGS. 6A and 6B are views respectively showing constellations in DCM.
Figure 6B:
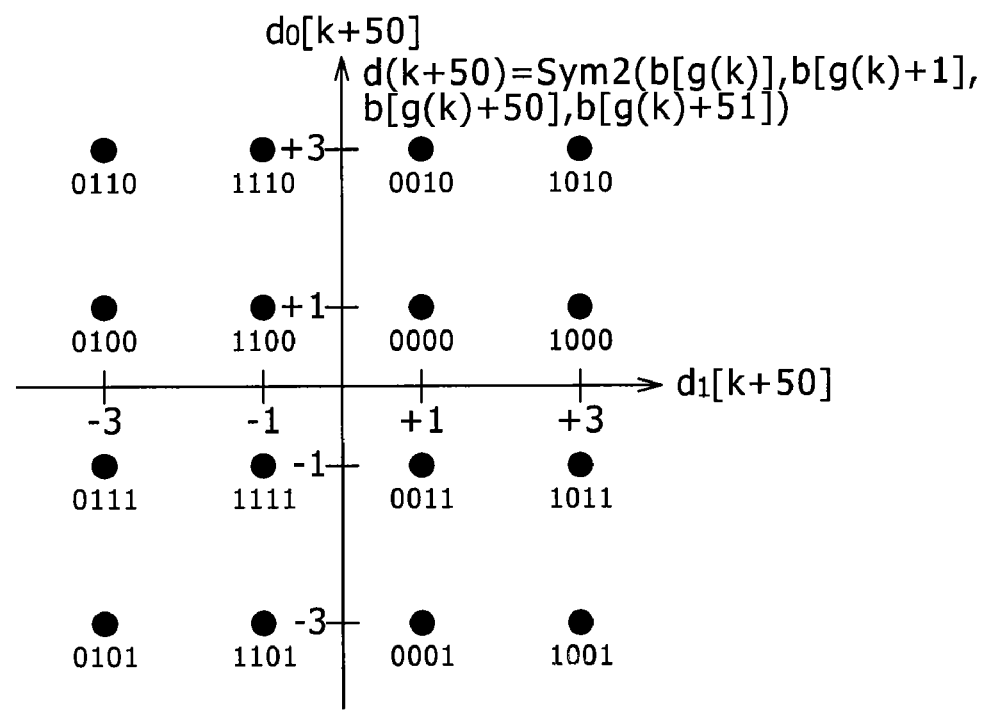
Figure 7:
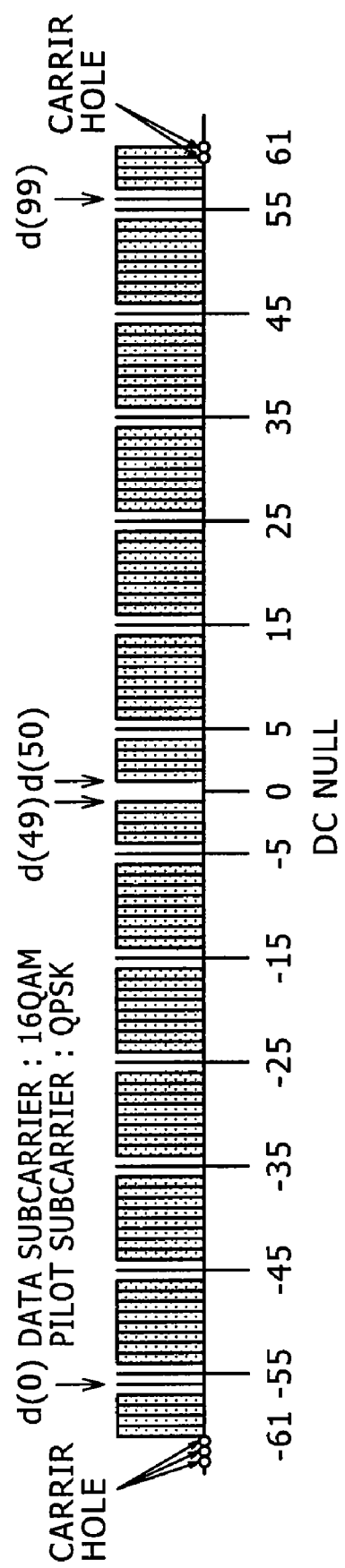
FIG. 7 is a view showing a subcarrier array in DCM.

As described above, in the DCM scheme, the same information is separated for the first-half and second-half carriers of the OFDM symbol, and distinct 16-QAM mapping processes are performed for the respective information streams. The constellation characteristics in that case are shown in FIGS. 6A and 6B. In the drawing figures, as attention is drawn to signal point arrays in which b0=1 (shown as "g[(k)]" FIGS. 6A and 6B), it can be known that, the same information (i.e., 1111, 1110, 1101, and 1100) are retained on the straight line corresponding to "I axis=3d" in FIG. 6A and on the straight line corresponding to "I axis=−1d" in FIG. 6B. Similarly, it can be known that, the same information (i.e., 1011, 1010, 1001, and 1000) are retained on the straight line corresponding to "I axis=1d" in FIG. 6A and on the straight line corresponding to "I axis=3d in FIG. 6B. Thus, likelihoods are calculated for only a combination of straight lines retaining the same information, thereby making it possible to reduce the number of calculations. The straight lines as defined above include not only the straight line parallel to the Q axis passing across, for example, the reference signal levels ±1d and ±3d on the I axis, but also include, for example, the straight line parallel to the I axis passing across, for example, the reference signal levels ±1d and ±3d on the Q axis.

Accordingly, respective Expression (11) to (13) can be further modified as shown below.

$$h1 = |Re\{y1 \cdot \exp(-j\arg(a1))\} - 3d \cdot |a1|\|^2 + |Re\{y2 \cdot \exp(-j\arg(a2))\} + d \cdot |a2|\|^2\} \quad (14)$$

$$h2 = |Re\{y1 \cdot \exp(-j\arg(a1))\} - d \cdot |a1|\|^2 + |Re\{y2 \cdot \exp(-j\arg(a2))\} - 3d \cdot |a2|\|^2\} \quad (15)$$

$$P(y1, y2|b0=1) = \text{Min}\{h1, h2\} \quad (16)$$

$$g1 = |Im\{y1 \cdot \exp(-j\arg(a1))\} + 3d \cdot |a1|\|^2 + |Im\{y2 \cdot \exp(-j\arg(a2))\} - d \cdot |a2|\|^2\} \quad (17)$$

$$g2 = |Im\{y1 \cdot \exp(-j\arg(a1))\} + d \cdot |a1|\|^2 + |Im\{y2 \cdot \exp(-j\arg(a2))\} + 3d \cdot |a2|\|^2\} \quad (18)$$

$$P(y1, y2|b0=0) = \text{Min}\{g1, g2\} \quad (19)$$

$$LLR(b0) = P(y1, y2|b0=1) - P(y1, y2|b0=0) \quad (20)$$

In the configuration of the demodulating circuit shown in FIG. 1, the processes described above is implemented in the following manner. At the outset, the symbol rotating section 11 rotates the respective input pilot symbol a1, a3 to the first quadrant (or, the fourth quadrant). The symbol rotating section 11 performs similar operation on the respective data symbol y1, y2, and then the CORDIC calculation section 12 starts the arctan calculation. When performing the CORDIC calculation for the data symbol, the CORDIC calculation section 12 receives the rotation direction information k obtained during the pilot symbol process (see Expression (10) above, thereby to concurrently perform the pilot symbol process and the data symbol rotation.

A basic operation of the CORDIC algorithm is as shown in FIG. 16, and the algorithm is configured to include iterative processing iterations of expressions, such as Expressions (9) and (10), in which, as shown in Expression (21) below, the rotation angle thereof can be represented by a cumulative value of a rotation element $(1+jk\alpha)$.

$$\arg(x) = \sum_i k_i \theta_i \quad (21)$$

In expression (21) represents the rotation direction in Expression (10), and $\theta_i$ represents the arctan $(\alpha k_i)$. Relationships between $k_i$ and $\theta_i$ are shown in Table 3 below.

TABLE 3

| $k_i$ | $\theta_i$ (deg) |
|---|---|
| 0 | 45.00 |
| 1 | 26.57 |
| 2 | 14.04 |
| 3 | 7.13 |
| 4 | 3.58 |

TABLE 3-continued

| $k_i$ | $\theta_i$ (deg) |
|---|---|
| 5 | 1.79 |
| 6 | 0.90 |
| 7 | 0.45 |
| 8 | 0.22 |

Thus, in the demodulating circuit shown in FIG. 1, data symbol processing can be commenced without waiting for completion of pilot symbol processing, thereby making it possible to significantly reduce the processing delay. Further in the demodulating circuit, since angle information that is obtained as the arctan calculation result does not have to be retained, the circuit size is reduced.

At the time point of completion of rotation by CORDIC processing, the pilot symbol is set to an angle of 0 degrees, thereby having a value indicative of a complex amplitude. In the present invention, the amplitude value is used as amplitude of a 16-QAM reference signal. The value corresponds to |a1| and |a2| in Expression (11) and (12) shown above.

As already described above, in the combining section 15, the method of combining two subcarriers can be selected from the maximum ratio combining method, the iso-gain combining method, and the selectively combining method, for example. By way of example, in Expression (14), the distances between the received symbols and reference signal levels on one of the axes are summed after squared, from which it can be construed that the maximum ratio combining method is carried out. Further, as shown in Expression (22) below, the squaring calculation can be omitted for circuit size reduction. In this case, the iso-gain combining method is used.

$$h1 = |Re\{y1 \cdot \exp(-j\arg(a1))\} - 3d \cdot |a1|| + |Re\{y2 \cdot \exp(-j\arg(a2))\} + d \cdot |a2|| \quad (22)$$

Alternatively, as shown in Expression (23), max(|a1|,|a2|) is calculated to demodulate only a subcarrier of high power, thereby making it possible to perform selectively combination.

$$h1 = \begin{cases} |Re\{y1 \cdot \exp(-j\arg(a1))\} - 3d \cdot |a1|| & \text{when } |a1| > |a2| \\ |Re\{y2 \cdot \exp(-j\arg(a2))\} + d \cdot |a2|| & \text{when } |a2| > |a1| \end{cases} \quad (23)$$

As above, description has been directed to the demodulation of the received 16-QAM mapped signal in the event that frequency diversity is employed with DCM in the MB-OFDM communication scheme. However, the DCM scheme itself is not essential. In addition, even by simplex QAM transmission without using DCM, even higher speed transmission (at 9600 Mbps, for example) can be implemented. Table 4 below summarizes transmission rates, modulation schemes allocated for the respective transmission rates, coding rates R, and other factors in the event that a high speed transmission mode is added without using DCM.

TABLE 4

| Transmission Rate [Mbps] | Modulation Scheme | Coding Rate [R] | Conjugate Symmetry Input for IFFT | Time Spreading Factor [TSF] | Segment Spread Gain | $N_{CBPS}$ |
|---|---|---|---|---|---|---|
| 39.4 | QPSK | 17/69 | Yes | 2 | 4 | 100 |
| 53.3 | OPSK | 1/3 | Yes | 2 | 4 | 100 |
| 80 | QPSK | 1/2 | Yes | 2 | 4 | 100 |

TABLE 4-continued

| Transmission Rate [Mbps] | Modulation Scheme | Coding Rate [R] | Conjugate Symmetry Input for IFFT | Time Spreading Factor [TSF] | Segment Spread Gain | $N_{CBPS}$ |
|---|---|---|---|---|---|---|
| 106.7 | QPSK | 1/3 | No | 2 | 2 | 200 |
| 160 | QPSK | 1/2 | No | 2 | 2 | 200 |
| 200 | QPSK | 5/8 | No | 2 | 2 | 200 |
| 320 | DCM | 1/2 | No | 1 | 1 | 200 |
| 400 | DCM | 5/8 | No | 1 | 1 | 200 |
| 480 | DCM | 3/4 | No | 1 | 1 | 200 |
| 640 | 16QAM | 1/2 | No | 1 | 1 | 400 |
| 800 | 16QAM | 5/8 | No | 1 | 1 | 400 |
| 960 | 16QAM | 3/4 | No | 1 | 1 | 400 |

In Table 4, the portions in the range of from 640 to 960 Mbps in the bottom three lines correspond to the high speed transmission mode. The embodiment of the invention is adaptable to ordinary 16 QAM, and is capable of performing on at a transmission rate of up to 960 Mbps maximum.

Figure 2:
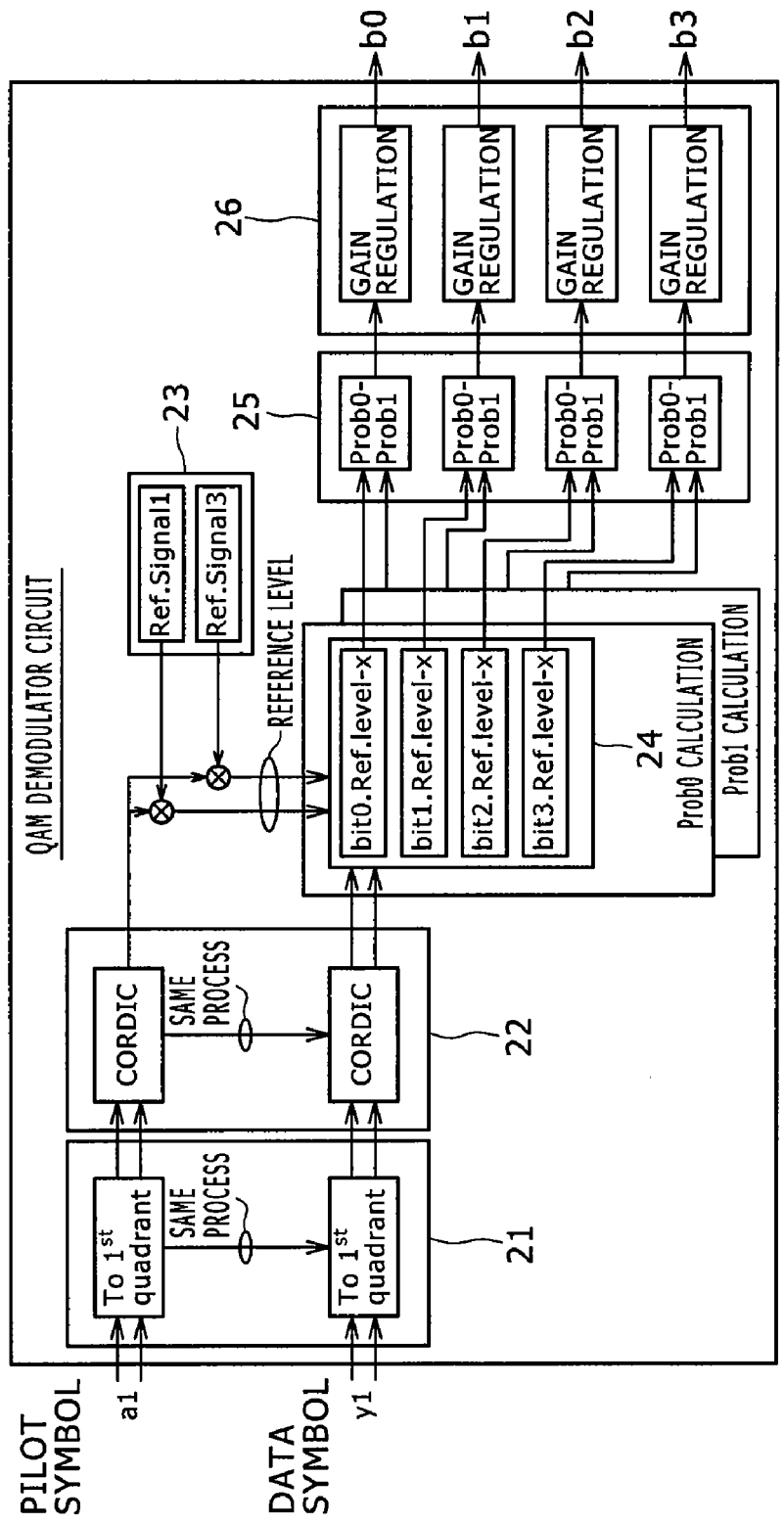
FIG. 2 is a view showing an exemplary configuration of a QAM demodulator circuit in the event that DCM is not performed, but simple 16-QAM transmission is performed.
Figure 3:
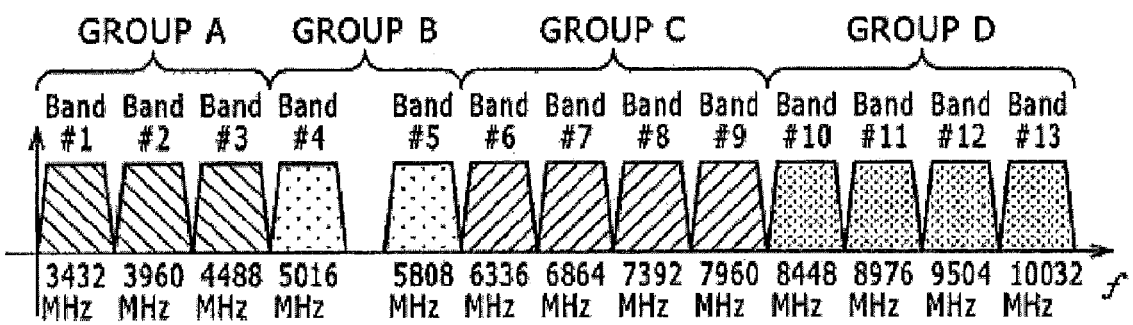
FIG. 3 is a view showing exemplary frequency mapping specified for a multiband OFDM UWB communication scheme ("MB-OFDM (scheme)," hereafter)
Figure 4:
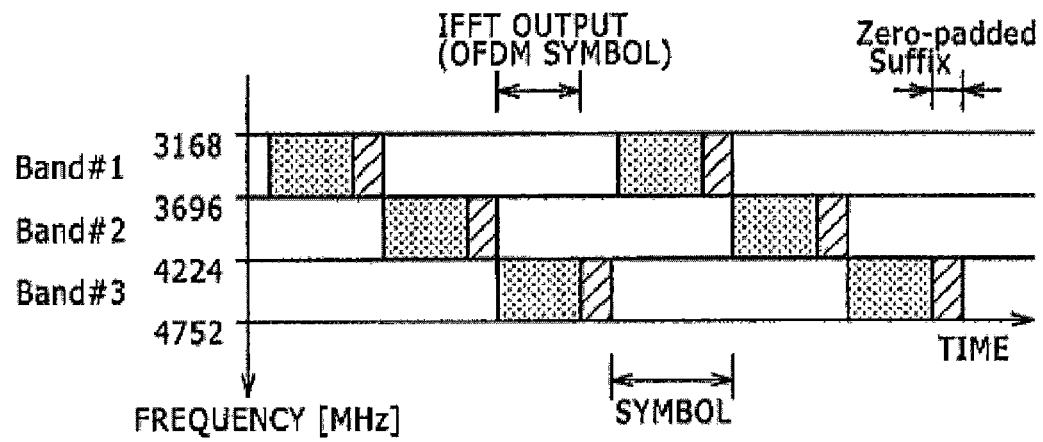
FIG. 4 shows a state of data transmission being performed in MB-OFDM through frequency hopping with respect to OFDM symbols on a time axis.

FIG. 2 is a view showing an exemplary configuration of a QAM demodulator circuit operable when performing simplex 16 QAM transmission without preforming DCM. The shown example is contemplated to receive one pilot symbol a1 (assumed to indicate the propagation-channel impulse response) and one data symbol y1 as inputs and to have soft decision values of four bits as outputs.

When the pilot symbol a1 is input, which are composed of the same information, first, in a symbol rotating section 21, the symbol is rotated to the first quadrant (when not in the first quadrant, though). Thereafter, in a CORDIC calculation section 22, the calculation of the phase-compensation dedicated arctan and the calculation of the absolute value of a predictive impulse response are concurrently carried out by using CORDIC.

Subsequently, when the data symbol y1 is input, similarly, in the symbol rotating section 21, the symbol is rotated to the first quadrant (when not in the quadrant, though). Thereafter, in a CORDIC calculation section 22, the phase rotation in the propagation channel is carried out for the data symbol y1 by using CORDIC. At the time point of completion of rotation by CORDIC processing, the pilot symbol is set to the angle of 0 degrees, thereby having a value indicative of a complex amplitude, and the amplitude value is used as amplitude of a 16-QAM reference signal.

In this case, in the symbol rotating section 21, the same rotation amount of the pilot symbol a1 is adapted to the data symbol y1, thereby to reduce the processing delay for the rotation to the first quadrant. Further, in the CORDIC calculation section 22, the arctan calculated through CORDIC for the pilot symbol a1 is used to provide the phase compensation of the data symbol y1, whereby the processing delay therefor is reduced. Thus, data symbol processing can be commenced without waiting for completion of pilot symbol processing, thereby making it possible to significantly reduce the processing delay. Further, in the demodulating circuit, since angle information that is obtained as the arctan calculation result does not have to be retained, the circuit size is reduced.

From a reference signal point s1 in units of transmission bits b0, b1, b2, and b3 in 16 QAM, a reference signal level generation section 23 generates, as a respective reference signal level, a coordinate value of the respective I, Q axis on which information of the reference signal point s1 is set. Where the inter-signal point distance is d on the I or Q axis, the 16-QAM reference signal level takes values "L1=1d" and "L2=3d." Further, the value is multiplied with the absolute value of the pilot symbol a1, which has been obtained from the by the CORDIC calculation section 22, thereby to obtain a per-transmission-signal reference signal level for the use of distance calculation.

A distance calculation section 24 carries out distance calculation between the data symbol y1 after the phase compensation (or, "post-phase compensation data symbol," hereafter) and the reference signal level in units of the transmission bit b0, b1, b2, b3. In this case, the post-phase compensation data symbol y1 is in the state where it is set on one of the I and Q axes. As such, actually, the distance calculation is not the complex distance calculation, but is the calculation of value of only one of the I and Q axes, consequently simplifying arithmetic processing.

A likelihood determining section 25 obtains, from the result of the distance calculation, probabilities that the bit values become 0 and 1 in units of the transmission bit b0, b1, b2, b3, thereby to make the likelihood determination. Smaller one of the I and Q axis values of the post-rotation data symbol is used as the likelihood for the respective transmission bit. Processes as described above are performed for two, separated first and second half subcarriers of the OFDM symbol, thereby to obtain likelihoods Prob0 and Prob1 that the respective transmission bit become 0 and 1. Then, Prob1 is subtracted from Prob0 in accordance with Expression (4).

A gain regulating section 26 carries out gain regulation and outputs the respective result as the decoding result obtained through soft determination.

According to the circuit configuration shown in FIG. 2, the decoding process is simplified by performing the distance determination on only one of the I and Q axes for the respective transmission bit. This is attributed to the fact that, when DCM signal point mapping has been performed in accordance with Expressions (1) to (3), since the signal point is set on one of the I and Q axes in the signal constellation (see FIG. 8), the complex distance need not be obtained, but the value of only one of the axes is used to thereby enable the demodulation. In this case, the probability of the bit value of the respective transmission bit can be obtained in the manner that rotation compensation is carried out for the data symbol y1 by using the arctan calculated by using CORDIC, and concurrently, only the minimum distance between the received symbol and the reference symbol on one of the axes is used.

However, it will be apparent to those skilled in the art that modifications and alterations may be made to the above described embodiments without departing from the scope and principles of the invention.

In the present disclosure, while description has been focused on the demodulation of the received 16-QAM mapped signal in the event that frequency diversity is employed with DCM in the MB-OFDM communication scheme, the invention is not limited thereby. The embodiments can be similarly adapted as well to 16 QAM and other QAM processing without using the DCM scheme. Of course, the embodiments can be adapted to cases where the OFDM modulation is not used as the primary modulation.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. A wireless communication device comprising:
   means for receiving a transmission signal through a propagation channel;
   means for performing a demodulation process of the transmission signal, the transmission signal having been subjected to a multi-level modulation process that, corresponding to a combination of bit values, performs mapping of an n-bit binary signal into $2^n$ signal points created in an I,Q signal constellation by using a combination of phase and amplitude, wherein in the multi-level modulation process, signal-point arrangement of reference symbols is made so that information of a respective one of transmission bits is set on one of an I axis and a Q axis in the I,Q signal constellation;
   a phase rotation compensating means that:
      (a) acquires a phase rotation angle in the propagation channel which phase rotation angle is contained in a received symbol; and
      (b) performs rotation compensation of the acquired phase rotation angle for the received symbol, wherein the phase rotation compensating means includes:
         (i) first symbol rotating means that rotates a received pilot symbol to a first quadrant by a rotating angle;
         (ii) a first Coordinate Rotation Digital Computer that obtains the phase rotation angle for a pilot symbol present within the first quadrant;
         (iii) second symbol rotating means that rotates a received data symbol by said rotation angle; and
         (iv) a second Coordinate Rotation Digital Computer that performs rotation compensation of the data symbol by using the rotation angle obtained by the first Coordinate Rotation Digital Computer;
   a reference signal generating means that generates, as a respective reference signal level, a coordinate value of the respective I, Q axis in the signal constellation on which the information of the respective reference signal point is set;
   a probability calculating means that, for the respective transmission bit, obtains respective probabilities that the transmission bit is 0 and 1 by making a distance determination of the distance between the received symbol after the rotation compensation and the respective reference signal level on only one of the I and Q axes; and a determining means that makes a likelihood determination of the bit value of the respective transmission bit in accordance with at least one of said probability values obtained by the probability calculating means.

2. The wireless communication device of claim 1, wherein the phase rotation compensating means obtains a declination of a received complex impulse response by using a Coordinate Rotation Digital Computer as the phase rotation angle.

3. The wireless communication device of claim 1, wherein the probability calculating means obtains the respective probabilities that the transmission bit is 0 and 1 by employing a minimum value of distances between the received symbol and the respective reference signal levels on one of the I and Q axes on which the information is set.

4. The wireless communication device of claim 1, wherein a multicarrier modulation scheme is used as a primary modulation scheme.

5. The wireless communication device of claim 4, wherein the reference signal generating means that obtains the respective reference signal level that is used by the probability calculating means, by multiplying the respective coordinate value on the I, Q axis, on which the information of the respective reference signal point is set, with an absolute value of the complex impulse response obtained from the pilot symbol by the second Coordinate Rotation Digital Computer calculation means.

6. A wireless communication method comprising:
   receiving a transmission signal through a propagation channel;
   performing a demodulation process of the transmission signal, the transmission signal having been subjected to a multi-level modulation process that, corresponding to a combination of bit values;
   performing mapping of an n-bit binary signal into $2^n$ signal points created in an I,Q signal constellation by using a combination of phase and amplitude, wherein
   in the multi-level modulation process, signal-point arrangement of reference symbols is made so that information of a respective one of transmission bits is set on one of an I axis and a Q axis in the I,Q signal constellation; and
   compensating a phase rotation by:
      (a) acquiring a phase rotation angle in the propagation channel which phase rotation angle is contained in a received symbol; and
      (b) performing rotation compensation of the acquired phase rotation angle for the received symbol;
   rotating a received pilot symbol to a first quadrant by a rotation angle;
   obtaining, by a Coordinate Rotation Digital Computer, the phase rotation angle for a pilot symbol present within the first quadrant;
   rotating a received data symbol by said rotation angle;
   performing rotation compensation of the data symbol by using the phase rotation angle obtained by the Coordinate Rotation Digital Computer;
   generating a reference signal by generating, as a respective reference signal level, a coordinate value of the respective I, Q axis in the signal constellation on which the information of the respective reference signal point is set;
   obtaining respective probabilities that the respective transmission bit is 0 and 1 by making a distance determination of the distance between the received symbol after the rotation compensation and the respective reference signal level on only one of the I and Q axes; and
   making a likelihood determination of the bit value of the respective transmission bit in accordance with at least one of said obtained probability values.

7. The wireless communication method of claim 6, wherein the phase rotation compensating step obtains a declination of a received complex impulse response by using Coordinate Rotation Digital Computer as the phase rotation angle.

8. The wireless communication method of claim 6, wherein obtaining the respective probabilities that the transmission bit is 0 and 1 includes employing a minimum value of distances between the received symbol and the respective reference signal levels on the one of the I and Q axes on which the information is set.

9. The wireless communication method of claim 6, wherein, multicarrier modulation scheme is used as a primary modulation scheme.

10. The wireless communication method of claim 9, wherein generating the reference signal includes obtaining the respective reference signal level that is used by the probability calculating step by multiplying the respective coordinate value on the I, Q axis, on which the information of the respective reference signal point is set, with an absolute value of the complex impulse response obtained from the pilot symbol by the second Coordinate Rotation Digital Computer calculation step.

11. A wireless communication device comprising:
a processor; and
a memory device storing instructions, which when executed by the processor, cause the processor to:
(a) receive a transmission signal through a propagation channel;
(b) perform a demodulation process of the transmission signal, the transmission signal having been subjected to a multi-level modulation process that, corresponding to a combination of bit values, performs mapping of an n-bit binary signal $2^n$ into signal points created in I,Q signal constellation by using a combination of phase and amplitude, wherein in the multi-level modulation process, signal-point arrangement of reference symbols is made so that information of a respective one of transmission bits is set on one of an I axis and a Q axis in the I,Q signal constellation;
(c) acquire a phase rotation angle in the propagation channel which phase rotation angle is contained in a received symbol and that performs rotation compensation of the acquired phase rotation angle for the received symbol;
(d) rotate a received pilot symbol to a first quadrant by a rotation angle;
(e) obtain, by a Coordinate Rotation Digital Computer, the phase rotation angle for a pilot symbol present within the first quadrant;
(f) rotate a received data symbol by said rotation angle;
(g) perform rotation compensation of the data symbol by using the phase rotation angle obtained by the Coordinate Rotation Digital Computer;
(h) generate, as a respective reference signal level, a coordinate value of the respective I, Q axis in the signal constellation on which the information of the respective reference signal point is set;
(i) for the respective transmission bit, obtain respective probabilities that the transmission bit is 0 and 1 by making a distance determination of the distance between the received symbol after the rotation compensation and the respective reference signal level on only one of the I and Q axes; and
(j) determine a likelihood of the bit value of the respective transmission bit in accordance with at least one of said obtained probability values.

* * * * *